(12) United States Patent
Umeya

(10) Patent No.: US 7,142,360 B2
(45) Date of Patent: Nov. 28, 2006

(54) PROJECTION SCREEN AND PROJECTION SYSTEM CONTAINING SAME

(75) Inventor: Masanori Umeya, Tokyo-To (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 116 days.

(21) Appl. No.: 10/864,876

(22) Filed: Jun. 10, 2004

(65) Prior Publication Data
US 2004/0252373 A1 Dec. 16, 2004

(30) Foreign Application Priority Data
Jun. 10, 2003 (JP) ............... 2003-165687
Jun. 18, 2003 (JP) ............... 2003-174031
Jun. 23, 2003 (JP) ............... 2003-178697

(51) Int. Cl.
G03B 21/60 (2006.01)
G02B 5/02 (2006.01)
G02F 1/1335 (2006.01)
C09K 19/02 (2006.01)

(52) U.S. Cl. ............ 359/443; 359/454; 359/459; 359/500; 359/492; 359/452; 359/599

(58) Field of Classification Search ........... 359/443, 359/454, 459, 500, 492, 452, 599, 487; 349/175, 349/185, 87, 96, 176, 115
See application file for complete search history.

(56) References Cited

U.S. PATENT DOCUMENTS 5,486,884 A * 1/1996 De Vaan .............. 353/122
6,381,068 B1 * 4/2002 Harada et al. ........... 359/443
6,906,764 B1 * 6/2005 Kashima et al. ......... 349/98
2005/0190442 A1 * 9/2005 Lippey et al. .......... 359/449

FOREIGN PATENT DOCUMENTS

EP 0 648 048 A1 10/1994
JP 5-107660 4/1993
JP 05107660 4/1993
JP 2002-540445 11/2002

OTHER PUBLICATIONS

St. John, W.D. et al. "Bragg reflection from cholesteric liquid crystals." Physical Review E, vol. 51, No. 2. Feb. 1995, pp. 1191-1198.
Shiozawa, Akihito et al. "Optical Properties of Diffusion-Type Cholesteric Piquid Crystalline Polymer Film." Mol. Cryst. And liq. Cryst., 2001, vol. 364, pp. 469-478.

* cited by examiner

Primary Examiner—W. B. Perkey
Assistant Examiner—Magda Cruz
(74) Attorney, Agent, or Firm—Oliff & Berridge, PLC

(57) ABSTRACT

A projection screen capable of sharply displaying an image even under bright environmental light with high image visibility. A projection screen has a polarized-light selective reflection layer with a cholesteric liquid crystalline structure, capable of selectively reflecting a specific polarized light component, and a substrate for supporting the reflection layer. Of the light entering the reflection layer from the viewer's side, the right-handed light in the selective reflection wave range is reflected from the reflection layer as reflected light. As a result of structural non-uniformity in the cholesteric liquid crystalline structure, the light that is selectively reflected (reflected light) is diffused.

29 Claims, 8 Drawing Sheets

1 μm ns of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

PROJECTION SCREEN AND PROJECTION SYSTEM CONTAINING SAME

BACKGROUND OF THE INVENTION

1. Field of the Invention

The present invention relates to a projection system in which imaging light emitted from a projector is projected on a projection screen to display thereon an image. More particularly, the present invention relates to a projection screen capable of sharply displaying an image and of providing high visibility, and to a projection system containing such a projection screen.

2. Description of Related Art

A conventional projection system usually operates as follows: imaging light emitted from a projector is projected on a projection screen, and viewers observe the light reflected from the projection screen as an image.

Typical examples of projection screens for use in such conventional projection systems include white-colored paper or cloth materials, and plastic films coated with inks that scatter white light. High-quality projection screens that comprise scattering layers containing beads, pearlescent pigments, or the like, capable of controlling the scattering of imaging light, also are now commercially available.

Projectors have become smaller in size and moderate in price in recent years, so that not only demand for projectors for commercial use but also demand for household projectors such as projectors for family theaters is growing, and an increasing number of families are now enjoying projection systems. Household projection systems are often placed in living rooms or the like, which are usually so designed that environmental light such as sunlight and light from lighting fixtures is abundant. Therefore, projection screens for use in household projection systems are expected to show good image display performance even under bright environmental light.

However, the above-described conventional projection screens cannot show good image display performance under bright environmental light because the screens reflect not only imaging light but also environmental light such as sunlight and light from lighting fixtures.

In such a conventional projection system, differences in the intensity of light (imaging light) projected on a projection screen from a projector cause light and shade to form an image. For example, in the case where a white image on a black background is projected, the projected-light-striking part of the projection screen becomes white and the other part becomes black; thus, differences in brightness between white and black cause light and shade to form the desired image. In this case, in order to attain excellent image display, it is necessary to make the contrast between the white- and black-indication parts greater by making the white-indication part lighter and the black-indication part darker.

However, since the above-described conventional projection screen reflects both imaging light and environmental light such as sunlight and light from light fixtures without distinction, both the white- and black-indication parts get lighter, and differences in brightness between white and black are decreased. For this reason, the conventional projection screen cannot satisfactorily provide good image display unless the influence of environmental light such as sunlight and light from lighting fixtures on the projection screen is suppressed by using a means for shading a room, or by placing the projection screen in a dark environment.

Under these circumstances, studies have been made on projection screens capable of showing good image display performance even under bright environmental light. There have so far been proposed projection screens utilizing holograms, polarized-light-separating layers, or the like (see Japanese Laid-Open Patent Publication No. 107660/1993 (JP '660) and Japanese Laid-Open Patent Publication No. 540445/2002 (JP '445)).

Of these conventional projection screens, those using holograms have the advantage that the white-indication part can be made lighter if the scattering of light is properly controlled, so that the screens can show relatively good image display performance even under bright environment light. However, holograms have wavelength selectivity but no polarization selectivity, meaning that the projection screens using holograms can display images only with limited sharpness. Moreover, it is difficult to produce large-sized projection screens by utilizing holograms due to production problems.

On the other hand, using the above-described conventional projection screens with polarized-light-separating layers, it is possible to make the white-indication part lighter and the black-indication part darker. Therefore, these projection screens can sharply display images even under bright environmental light as compared with the projection screens using holograms.

Specifically, for example, JP '660 describes a projection screen having a cholesteric liquid crystal that reflects red, green and blue light (right- or left-handed circularly polarized light) contained in imaging light. This projection screen is made not to reflect nearly half the environmental light incident on the screen by making use of the circularly-polarized-light-separating property of the cholesteric liquid crystal.

However, in the projection screen described in JP '660, since the cholesteric liquid crystal is in the state of planar orientation, specular reflection occurs when the projection screen reflects light, and the reflected light cannot be well recognized as an image. Namely, to recognize the reflected light as an image, it is necessary that the reflected light be scattered. However, JP '660 is silent on this point.

On the other hand, JP '445 describes a projection screen using, as a reflective polarization element, a multi-layered reflective polarizer or the like, having diffusing power. This projection screen does not reflect part of the environmental light incident on the screen because of the polarized-light-separating property of the multi-layered reflective polarizer, and diffuse-reflects the rest of the incident light due to interfacial reflection that occurs in the multi-layered reflective polarizer composed of materials having different refractive indices, or by means of a diffusing element provided separately from the multi-layered reflective polarizer. JP '445 also describes a projection screen using in combination a cholesteric reflective polarizer as a reflective polarization element and a diffusing element. This projection screen does not reflect part of the environmental light incident on the screen because of the polarized-light-separating property of the cholesteric reflective polarizer, and diffuse-reflects the rest of the incident light by means of the diffusing element provided separately from the cholesteric reflective polarizer.

Of the projection screens described in JP '445, the former one must contain a multi-layered reflective polarizer or the like that is a linear polarization element ("DBEF" manufactured by 3M Corporation, etc.). When this projection screen is incorporated into a projection system or the like, it is necessary to make the plane of polarization of the linear polarization element agree with the plane of polarization of a projector that emits linearly polarized light, such as a liquid crystal projector. If these planes of polarization do not agree with each other, excellent image display cannot be attained.

Further, of the projection screens described in JP '445 the latter one contains, as the reflective polarization element, a circular polarization element such as a cholesteric reflective polarizer. However, since the diffusing element for scattering the reflected light is provided on the viewer's side of the reflective polarization element, the polarized-light-separating property of the reflective polarization element is impaired, and image visibility cannot be fully improved.

Namely, since the diffusing element is provided on the viewer's side of the reflective polarization element, light passes through the diffusing element before entering the reflective polarization element, and its state of polarization is disturbed, which is called "depolarization." Light that passes through the diffusing element includes two types of light, that is, environmental light (sunlight, etc.) and imaging light. If the state of polarization of environmental light is disturbed by the diffusing element, the light that the reflective polarization element inherently transmits is, because of depolarization, converted into a component that the reflective polarization element reflects, and this component is reflected from the reflective polarization element as unnecessary light. On the other hand, if the state of polarization of imaging light is disturbed by the diffusing element, the light that the reflective polarization element inherently transmits is, because of depolarization, converted into a component that the reflective polarization element does not reflect, and this component passes through the reflective polarization element. Because of these two phenomena, the original polarized-light-separating property is impaired, and image visibility cannot be fully improved.

Moreover, in the projection screens described in JP '660 and JP '445, it is necessary to provide anti-glaring layers in order to prevent the projection screens from glaring. The polarized-light-separating property is impaired also by such anti-glaring layers.

In sum, the above-described conventional projection screens, including those ones using holograms and those ones described in JP '660 and JP '445, using polarized-light-separating layers, can display images only with limited sharpness under bright environmental light. Therefore, it has so far been impossible to fully improve image visibility.

SUMMARY OF THE INVENTION

The present invention has been accomplished under these above-mentioned circumstances. An object of the present invention is therefore to provide a projection screen capable of sharply displaying an image even under bright environmental light and of providing intensified brightness and high visibility, and a projection system containing such a projection screen.

(Means for Fulfilling the Object)

A first aspect of the present invention is a projection screen that displays an image by reflecting imaging light projected, containing a polarized-light selective reflection layer having a cholesteric liquid crystalline structure and adapted selectively to reflect a specific polarized light component, wherein the polarized-light selective reflection layer selectively reflects the light component while diffusing the light component as a result of structural non-uniformity in the cholesteric liquid crystalline structure.

In the above-described first aspect of the present invention, it is preferable that the cholesteric liquid crystalline structure of the polarized-light selective reflection layer includes a plurality of helical-structure parts that have different directions of helical axes.

Further, in the above-described first aspect of the present invention, it is preferable that the cholesteric liquid crystalline structure of the polarized-light selective reflection layer includes a layered-structure area in which planes of nematic layers are layered and edge-shaped-structure parts that are formed in the layered-structure area by a partial edge dislocation of the planes of nematic layers, and that the plurality of helical-structure parts that have different directions of helical axes are obtained due to directions of helical axes of the cholesteric liquid crystalline structure being changed in the edge-shaped-structure parts and their vicinity.

Furthermore, in the above-described first aspect of the present invention, it is preferable that the plurality of helical-structure parts in the cholesteric liquid crystalline structure of the polarized-light selective reflection layer contain, in one cross section taken in a direction of a normal, that is, in a direction of a thickness of the polarized-light selective reflection layer, those helical-structure parts in which the helical axes thereof are tilted clockwise relative to the normal and those helical-structure parts in which the helical axes thereof are tilted counterclockwise relative to the normal. In this case, in some of the helical-structure parts, the directions of the helical axes thereof may be the same as the direction of the normal.

Furthermore, in the above-described first aspect of the present invention, it is preferable that the polarized-light selective reflection layer selectively reflects light in a specific wave range that covers only a part of the visible region. More specifically, it is preferable that the polarized-light selective reflection layer has, for light in a wave range that covers only a part of the visible region, reflectivity not less than half the maximum reflectivity of this layer. Moreover, assuming that light enters the polarized-light selective reflection layer vertically to it, it is preferable that the polarized-light selective reflection layer selectively reflects light in wave ranges whose centers are between 430 nm and 460 nm, between 540 nm and 570 nm, and between 580 nm and 620 nm.

Furthermore, in the above-described first aspect of the present invention, it is preferable that the polarized-light selective reflection layer contains at least two partial selective reflection layers laminated to each other, each of the partial selective reflection layers having a cholesteric liquid crystalline structure adapted selectively to reflect a specific polarized light component and to diffuse the selectively reflected light as a result of structural non-uniformity in the cholesteric liquid crystalline structure, and the liquid crystalline structures of the partial selective reflection layers are different in helical pitch.

Furthermore, in the above-described first aspect of the present invention, it is preferable that the projection screen further includes a substrate that supports the polarized-light selective reflection layer. It is herein preferable that the substrate has a light-absorbing layer adapted to absorb light in the visible region.

Furthermore, in the above-described first aspect of the present invention, it is preferable that the projection screen further contains an intermediate layer between the polarized-light selective reflection layer and the substrate, whereby liquid crystalline molecules in the cholesteric liquid crystalline structure of the polarized-light selective reflection layer, present in a vicinity of a surface of the intermediate layer, are aligned so that directors of the liquid crystalline molecules point in a plurality of directions. It is herein preferable that a intermediate layer be an adhesion-improving layer for improving adhesion between the polarized-light selective reflection layer and the substrate. It is also preferable that the intermediate layer has a light-absorbing layer adapted to absorb light in the visible region.

Furthermore, in the above-described first aspect of the present invention, it is preferable that the projection screen further includes, on a side of the substrate opposite to a side on which the polarized-light selective reflection layer is provided, a pressure sensitive adhesive layer so that the substrate on which the polarized-light selective reflection layer is provided can be affixed to an external member.

Furthermore, in the above-described first aspect of the present invention, it is preferable that the projection screen further contains, on a side of the substrate opposite to a side on which the polarized-light selective reflection layer is provided, a light-reflecting layer for reflecting light that is incident on the substrate.

Furthermore, in the above-described first aspect of the present invention, it is preferable that the projection screen further has, on an outermost, viewer's side surface of the polarized-light selective reflection layer, a hard coat layer for preventing the surface of the projection screen from being scratched. It is herein preferable that the hard coat layer has a surface hardness of 2H or more when expressed by the pencil hardness according to JIS K5400.

Furthermore, in the above-described first aspect of the present invention, it is preferable that the projection screen further contains, on a viewer's side of the polarized-light selective reflection layer, an anti-glaring layer for preventing the projection screen from glaring.

Furthermore, in the above-described first aspect of the present invention, it is preferable that the projection screen further has, on a viewer's side of the polarized-light selective reflection layer, an anti-reflection layer for preventing the projection screen from reflecting extraneous light.

Furthermore, in the above-described first aspect of the present invention, it is preferable that the projection screen further includes, on a viewer's side of the polarized-light selective reflection layer, an ultraviolet-absorbing layer adapted to absorb ultraviolet light incident on the projection screen.

Furthermore, in the above-described first aspect of the present invention, it is preferable that the projection screen further includes, on at least one of viewer's side and backside surfaces of the polarized-light selective reflection layer, an antistatic layer for preventing the projection screen from being electrostatically charged. It is herein preferable that the antistatic layer has a surface resistivity of $1 \times 10^{11}$ $\Omega/\square$ or less.

Furthermore, in the above-described first aspect of the present invention, it is preferable that the polarized-light selective reflection layer be made from a polymerizable liquid crystalline material.

A second aspect of the present invention is a projection system containing a projection screen according to the above-described first aspect of the present invention; and a projector that projects imaging light on the projection screen.

In the above-described second aspect of the present invention, it is preferable that the projection screen selectively reflects only light in a wave range that is identical with a wave range in which a imaging light projected from the projector falls.

Further, in the above-described second aspect of the present invention, it is preferable that the imaging light to be projected on the projection screen from the projector contains mainly a polarized light component that is identical to a polarized light component that the projection screen selectively reflects.

Furthermore, in the above-described second aspect of the present invention, it is preferable that the projection system further includes an illuminant for illuminating a space in which the projection screen is placed, the illuminant being so positioned that light emitted from the illuminant directly illuminates the projection screen, wherein light emitted from the illuminant toward the projection screen contains mainly a polarized light component that is different from a polarized light component that the projection screen selectively reflects.

Furthermore, in the above-described second aspect of the present invention, it is preferable that the projection system further contains an illuminant for illuminating a space in which the projection screen is placed, the illuminant being so positioned that light emitted from the illuminant indirectly illuminates the projection screen via a reflector, wherein the light emitted from the illuminant toward the reflector contains mainly a polarized light component that is identical to a polarized light component that the projection screen selectively reflects.

(Principle and Actions of the Present Invention)

According to the present invention, the projection screen includes a polarized-light selective reflection layer having a cholesteric liquid crystalline structure and adapted selectively to reflect a specific polarized light component, and the light component that is selectively reflected is diffused as a result of structural non-uniformity in the cholesteric liquid crystalline structure.

The polarized-light selective reflection layer selectively reflects only a specific polarized light component (e.g., right-handed circularly polarized light) because of the polarized-light-separating property of the cholesteric liquid crystalline structure, so that this layer can be made to reflect only approximately 50% of the unpolarized environmental light such as sunlight and light from light fixtures that are incident on this layer. For this reason, while maintaining the brightness of the light-indication part such as a white-indication part, it is possible to lower the brightness of the dark-indication part such as a black-indication part to nearly half, thereby obtaining a nearly twice-enhanced image contrast. In this case, if the imaging light to be projected is made to contain mainly a polarized light component that is identical with the polarized light component that the polarized-light selective reflection layer selectively reflects (e.g., right-handed circularly polarized light), the polarized-light selective reflection layer can reflect nearly 100% of the imaging light projected on this layer, that is, this layer can efficiently reflect the imaging light.

Further, in the polarized-light selective reflection layer, the cholesteric liquid crystalline structure is structurally non-uniform, and the helical-structure parts contained in the cholesteric liquid crystalline structure have different directions of helical axes because edge-shaped-structure parts are present in the layered-structure area in which the planes of nematic layers are layered. Therefore, the polarized-light selective reflection layer reflects imaging light not by specular reflection but by diffuse reflection, and the reflected light thus can be well recognized as an image. At this time, as a result of structural non-uniformity in the cholesteric liquid crystalline structure, the polarized-light selective reflection layer diffuses the selectively reflected light. The polarized-light selective reflection layer can, therefore, reflect a specific polarized light component while diffusing it, and, at the same time, transmit the other light components without diffusing them. For this reason, the environmental light and imaging light that pass through the polarized-light selective reflection layer do not undergo the above-described depolarization, and it is thus possible to improve image visibility while maintaining the polarized-light-separating property inherent in the polarized-light selective reflection layer.

As mentioned above, according to the present invention, because of the polarized-light-separating property of the cholesteric liquid crystalline structure, the influence of environmental light such as sunlight and light from lighting fixtures on the projection screen is suppressed, and image contrast is thus enhanced; on the other hand, as a result of structural non-uniformity in the cholesteric liquid crystalline structure, the projection screen diffuses, without decreasing image visibility, imaging light when the projection screen reflects that light. For this reason, the projection screen of the invention can sharply display an image even under bright environmental light. Moreover, because the projection screen does not glare as a result of structural non-uniformity in the cholesteric liquid crystalline structure, it is not necessary separately to provide an anti-glaring layer or the like having a rough (matte) surface, and a high-quality, sharp image that gives no rough feel can be obtained without an anti-glaring layer.

Further, according to the present invention, by allowing the polarized-light selective reflection layer selectively to reflect light in a specific wave range that covers only a part of the visible region, more specifically, by allowing the polarized-light selective reflection layer to have, for light in a wave range that covers only a part of the visible region, reflectivity not less than half the maximum reflectivity of this layer, the influence of environmental light such as sunlight and light from lighting fixtures on the projection screen is further suppressed. Therefore, image contrast is enhanced, and image visibility is further improved.

A projector, such as a liquid crystal projector, that projects imaging light on a projection screen attains color display by using light in the wave ranges of red (R), green (G), and blue (B) colors, the three primary colors. For example, assuming that light emitted from a projector enters the projection screen vertically to it, light in selective reflection wave ranges whose centers are between 430 nm and 460 nm, between 540 nm and 570 nm, and between 580 nm and 620 nm are projected on the screen. Therefore, if the projection screen on which such imaging light is projected is made selectively to reflect only light in the above-described wave ranges, the light in the wave ranges of the three primary colors, projected from a projector, is efficiently reflected, while, of the environmental light such as sunlight and light from lighting fixtures, the visible light that is not in the above-described wave ranges is not reflected. It is thus possible to attain excellent color image display while enhancing image contrast.

Furthermore, according to the present invention, by controlling the state of polarization of imaging light to be projected on the projection screen from a projector, it is possible to suppress the influence, on the projection screen, of stray light originating from the imaging light, thereby enhancing image contrast and further improving image visibility.

Namely, by making the imaging light that is projected on the projection screen from a projector contain mainly a polarized light component identical to the polarized light component that the projection screen selectively reflects, it is possible effectively to prevent production of stray light or the like from a polarized light component (e.g., left-handed circularly polarized light) that is different from the polarized light component that the polarized-light selective reflection layer in the projection screen selectively reflects, thereby enhancing image contrast.

Furthermore, according to the present invention, by controlling the state of polarization of the light emitted from the illuminant, it is possible to suppress the influence of this light on the projection screen, thereby enhancing image contrast and further improving image visibility.

Namely, in the case where the illuminant is so positioned that the light emitted from the illuminant directly illuminates the projection screen, it is preferable to make the light emitted from the illuminant toward the projection screen contain mainly a polarized light component (e.g., left-handed circularly polarized light) that is different from the polarized light component that the projection screen selectively reflects. By doing so, it is possible effectively to prevent the light of the illuminant from being reflected from the polarized-light selective reflection layer in the projection screen, thereby enhancing image contrast. On the other hand, when the illuminant is so positioned that the light emitted from the illuminant illuminates the projection screen indirectly via a reflector, it is preferable to make the light emitted from the illuminant toward the reflector contain mainly a polarized light component (e.g., right-handed circularly polarized light) that is identical with the polarized light component that the projection screen selectively reflects. If so made, the light from the illuminant, the state of polarization of the light being reversed by the reflector, is to contain mainly a polarized light component (e.g., left-handed circularly polarized light) that is different from the polarized light component that the projection screen selectively reflects. Therefore, the polarized-light selective reflection layer in the projection screen does not reflect the light emitted from the illuminant, and image contrast is thus enhanced.

DETAILED DESCRIPTION OF PREFERRED EMBODIMENTS

Embodiments of the present invention will be described hereinafter with reference to the accompanying drawings.

Projection Screen

First of all, a projection screen according to an embodiment of the present invention will be described with reference to FIG. 1.

Figure 1:
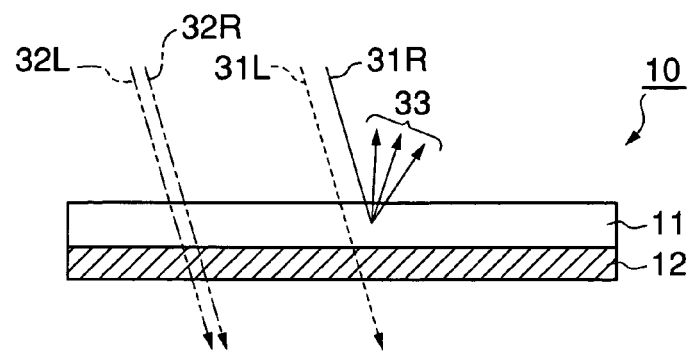
FIG. 1 is a diagrammatic sectional view showing a projection screen according to an embodiment of the present invention.

As shown in FIG. 1, a projection screen 10 according to this embodiment is for displaying an image by reflecting imaging light projected from the viewer's side (the upper side of the figure), and includes a polarized-light selective reflection layer 11 having a cholesteric liquid crystalline structure and adapted selectively to reflect a specific polarized light component, and a substrate 12 that supports the polarized-light selective reflection layer 11.

Of these components, the polarized-light selective reflection layer 11 is made from a cholesteric liquid crystalline composition, and physically, liquid crystalline molecules in this layer are aligned in helical fashion in which the directors of the liquid crystalline molecules are continuously rotated in the direction of the thickness of the layer.

As a result of such a physical alignment of the liquid crystalline molecules, the polarized-light selective reflection layer 11 has the polarized-light-separating property, the property of separating a light component circularly polarized in one direction from a light component circularly polarized in the opposite direction. Namely, the polarized-light selective reflection layer 11 converts unpolarized light that enters this layer along the helical axis into light in two different states of polarization (right-handed circularly polarized light and left-handed circularly polarized light), and transmits one of these lights and reflects the other. This phenomenon is known as circular dichroism. If the direction of rotation of liquid crystalline molecular helix is selected properly, a light component circularly polarized in the same direction as this direction of rotation is reflected selectively.

In this case, the scattering of polarized light is maximized at the wavelength $\lambda 0$ given by the following equation (1):

$$\lambda 0 = nav \cdot p, \quad (1)$$

wherein p is the helical pitch in the helical structure consisting of liquid crystalline molecules (the length of one liquid crystalline molecular helix), and nav is the mean refractive index on a plane perpendicular to the helical axis.

On the other hand, the width $\Delta\lambda$ of the wave range in which the wavelength of light to be reflected falls is given by the following equation (2):

$$\Delta\lambda = \Delta n \cdot p, \quad (2)$$

wherein $\Delta n$ is the value of birefringence.

Namely, as shown in FIG. 1, of the unpolarized light that has entered the projection screen 10 from the viewer's side (i.e., right-handed circularly polarized light 31R and left-handed circularly polarized light 31L in the selective reflection wave range, and right-handed circularly polarized light 32R and left-handed circularly polarized light 32L not in the selective reflection wave range), one of the circularly polarized light components in the wave range (selective reflection wave range) with the width $\Delta\lambda$, centered at the wavelength $\lambda 0$ (e.g., right-handed circularly polarized light 31R in the selective reflection wave range) is reflected from the projection screen 10 as reflected light 33, and the other light (e.g., left-handed circularly polarized light 31L in the selective reflection wave range, and right-handed circularly polarized light 32R and left-handed circularly polarized light 32L not in the selective reflection wave range) pass through the projection screen 10.

Figure 2A:
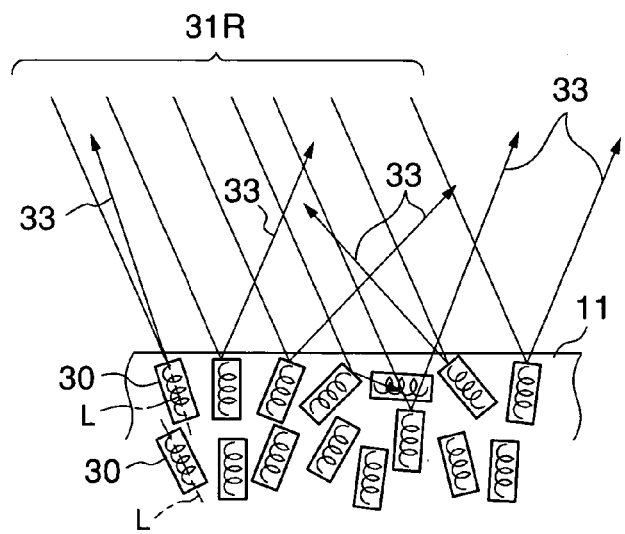
FIGS. 2A and 2B are illustrations showing the state of orientation of and optical function of the polarized-light selective reflection layer in the projection screen shown in FIG. 1.

The cholesteric liquid crystalline structure of such a polarized-light selective reflection layer 11 has a plurality of helical-structure parts 30 that have different directions of helical axes L, as shown in FIG. 2A. As a result of structural non-uniformity in such a cholesteric liquid crystalline structure, the light that the polarized-light selective reflection layer 11 selectively reflects (reflected light 33) is diffused. The state in which the cholesteric liquid crystalline structure is structurally non-uniform herein includes the state in which the helical-structure parts 30 contained in the cholesteric liquid crystalline structure have different directions of helical axes L; the state in which at least some of the planes of nematic layers (the planes on which the directors of liquid crystalline molecules point in the same X-Y direction) are not parallel to the plane of the polarized-light selective reflection layer 11 (the state in which, in a sectional TEM photo of a cholesteric liquid crystalline structure specimen that has been stained (a photomicrograph of the sectional structure taken by a transmission electron photomicroscope), continuous curves that appear as light-and-dark patterns are not parallel to the substrate plane); and the state in which finely divided particles of a cholesteric liquid crystal are dispersed in the cholesteric liquid crystalline structure as a pigment. The "diffusion" that is caused by such structural non-uniformity in the cholesteric liquid crystalline structure means that the light (imaging light) reflected at the projection screen 10 is spread or scattered to such an extent that viewers can recognize the reflected light as an image. In this specification, the term "helical-structure part" refers to a block structure of liquid crystalline molecules in which the helical axes L extend substantially in one direction and the helical length is substantially equal to one or more helical pitches.

Figure 2B:
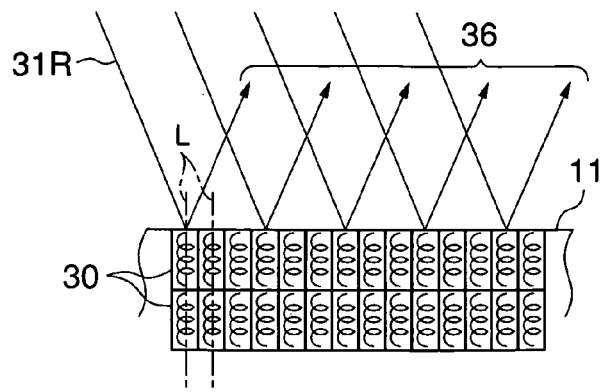

On the contrary, a conventional cholesteric liquid crystalline structure is in the sate of planar orientation, and the helical axes L in helical-structure parts 30 contained in the cholesteric liquid crystalline structure extend in parallel in the direction of the thickness of the layer, as shown in FIG. 2B. Therefore, when the cholesteric liquid crystalline structure selectively reflects light, specular reflection occurs (see reference numeral 36 in FIG. 2B).

The details of the cholesteric liquid crystalline structure of the polarized-light selective reflection layer 11 will be described hereinafter with reference to FIGS. 3 to 5.

Figure 3:
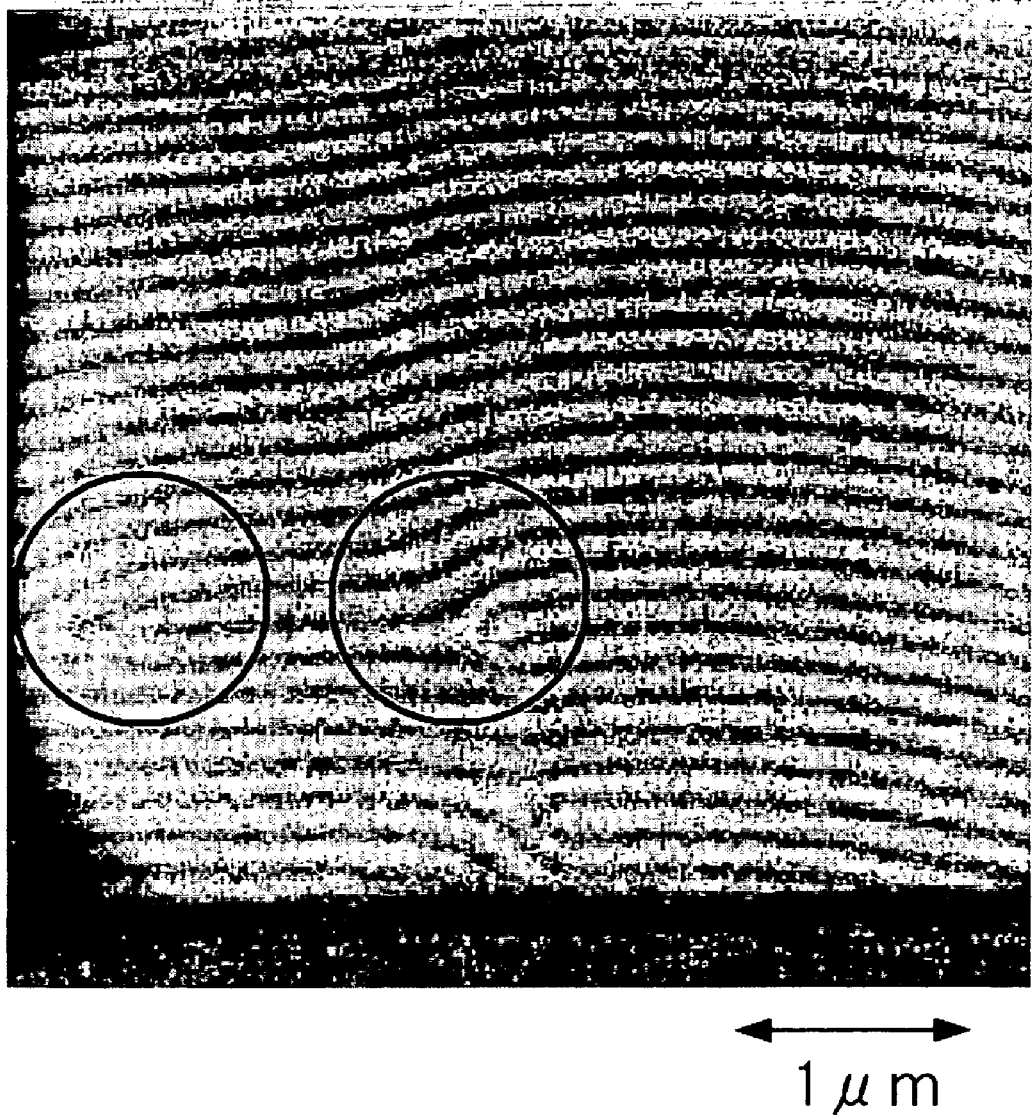
FIG. 3 is a photomicrograph showing an example of the sectional structure of the cholesteric liquid crystalline structure of the polarized-light selective reflection layer in the projection screen shown in FIG. 1.

FIG. 3 is a sectional TEM photo showing an example of the sectional structure of the cholesteric liquid crystalline structure of the polarized-light selective reflection layer 11.

As shown in FIG. 3, the cholesteric liquid crystalline structure of the polarized-light selective reflection layer 11 has a layered-structure area in which the planes of nematic layers are layered and edge-shaped-structure parts formed in the layered-structure area by the partial edge dislocation of the planes of nematic layers. In FIG. 3, the black-and-white lines indicate the planes of nematic layers, and the distance between a pair of the white and black lines is equal to one pitch. The direction of the helical axis is identical with the direction of the normal to these two lines.

The term "edge-shaped structure" herein refers to a liquid crystalline structure formed as a result of edge dislocation, composed of lines connecting defects (disclination) caused by abrupt changes in the direction of the helical axis L in the cholesteric liquid crystalline structure of the polarized-light selective reflection layer 11. For example, the structures shown in the circles in FIG. 3 are the edge-shaped structures. If such edge-shaped structures are formed in the cholesteric liquid crystalline structure, the directions of the helical axes L partially change in the edge-shaped-structure parts and their vicinity. As a result, the above-described helical-structure parts 30 that have different directions of helical axis L should exist in the cholesteric liquid crystalline structure. Because of the existence of a plurality of the helical-structure parts 30, light incident on the polarized-light selective reflection layer 11 is reflected not by specular reflection but by diffuse reflection, so that the reflected light can be well recognized as an image.

It is preferable that the edge-shaped-structure parts contained in the cholesteric liquid crystalline structure of the polarized-light selective reflection layer 11 be of a predetermined density. Specifically, the number of the edge-shaped-structure parts present in a cross section of the polarized-light selective reflection layer 11 in a predetermined size (e.g., a cross section with a base length of 100 μm and a height of 1 μm) is preferably from 6 to 70, particularly from 10 to 50. In the case where the number of the edge-shaped-structure parts is smaller than this range, the polarized-light selective reflection layer 11 cannot fully cause diffuse reflection, so that the visual field of the projection screen 10 narrows. On the other hand, when the number of the edge-shaped-structure parts exceeds the above-described range, the polarized-light selective reflection layer 11 cannot efficiently reflect light because of excessive structural disturbance, so that the image displayed on the projection screen 10 gets darker.

The number of the edge-shaped-structure parts can be determined from such a sectional TEM photo as is shown in FIG. 3, taken by a transmission electron photomicroscope. For example, by counting visually, it is possible to obtain the number of the edge-shaped-structure parts present in a predetermined-sized area of the photomicrograph (the size corresponding to a cross section of 100 μm×1 μm). In the case where the thickness of the specimen used for this measurement is smaller than 1 μm, the number of the edge-shaped-structure parts obtained is multiplied by a predetermined number (a value for converting the thickness of the specimen to 1 μm).

To form the above-described edge-shaped-structure parts in the cholesteric liquid crystalline structure of the polarized-light selective reflection layer 11, it is possible to use any method that can disturb the alignment of liquid crystalline molecules in the cholesteric liquid crystalline structure. Examples of methods useful for this purpose include: a method in which a material that exerts aligning power not in one direction is used as the substrate 12 on which the polarized-light selective reflection layer 11 is formed; a method in which the content of a surface-active agent or leveling agent usually incorporated in the polarized-light selective reflection layer 11 is properly controlled; a method in which a polymerizable compound having no aligning power is incorporated in the polarized-light selective reflection layer 11; and any combination of these methods.

By allowing the edge-shaped-structure parts to exist in the above-described manner, the plurality of helical-structure parts 30 that have different directions of helical axes L are formed in the cholesteric liquid crystalline structure of the polarized-light selective reflection layer 11. Preferably, the plurality of helical-structure parts 30 thus formed include, in one cross section taken in the direction of the normal A, that is, in the direction of the thickness of the polarized-light selective reflection layer 11, both those helical-structure parts 30(R) in which the helical axes L are tilted clockwise relative to the normal A (those helical-structure parts in which the helical axes L make acute angles α with the normal A in a clockwise direction) and those helical-structure parts 30(L) in which the helical axes L are tilted counterclockwise relative to the normal A (those helical-structure parts in which the helical axes L make acute angles β with the normal A in a counterclockwise direction), as shown in FIG. 4. In this case, in some of the helical-structure parts 30, the directions of the helical axes L may be the same as the direction of the normal A (see reference numeral 30(V) in FIG. 4). If the helical-structure parts 30 include the above-described two different types of parts, the polarized-light selective reflection layer 11 reflects the incident light not by specular reflection but by diffuse reflection in two or more different directions, so that the reflected light can be well recognized as an image.

Figure 4:
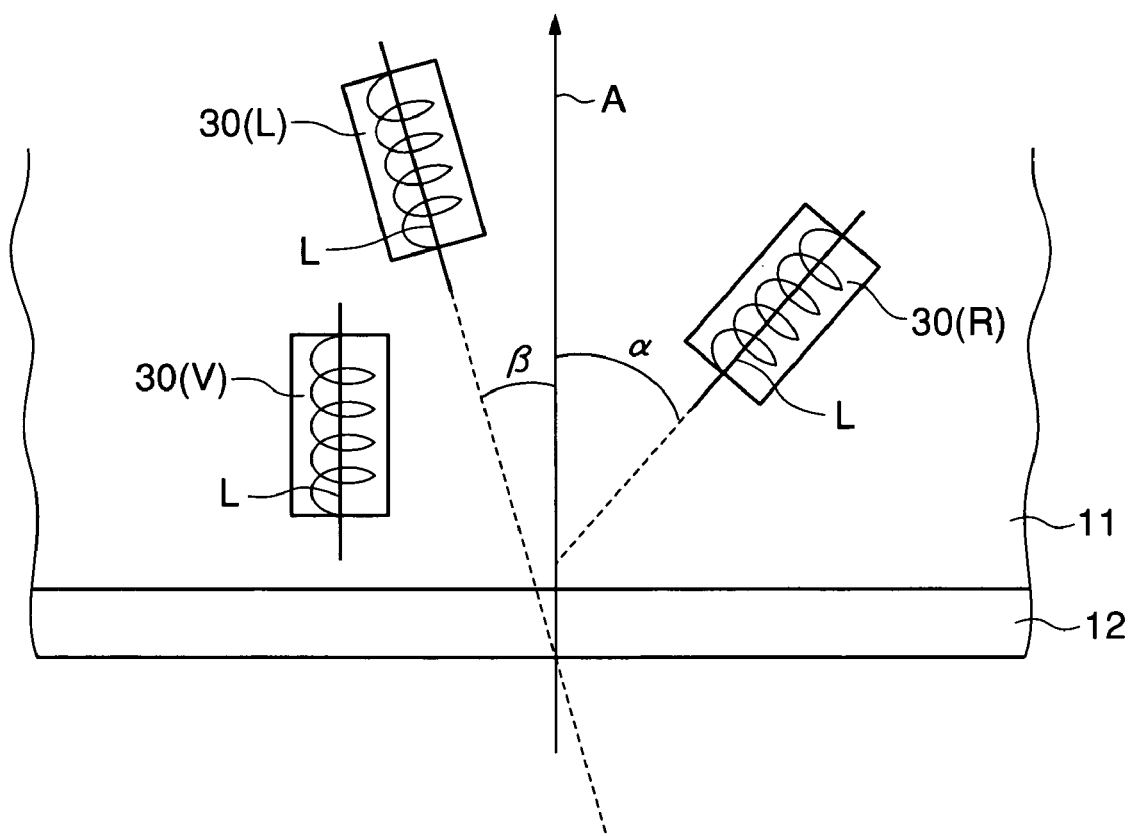
FIG. 4 is an illustration showing in more detail the state of orientation of and optical function of the polarized-light selective reflection layer in the projection screen shown in FIG. 1.
Figure 5:
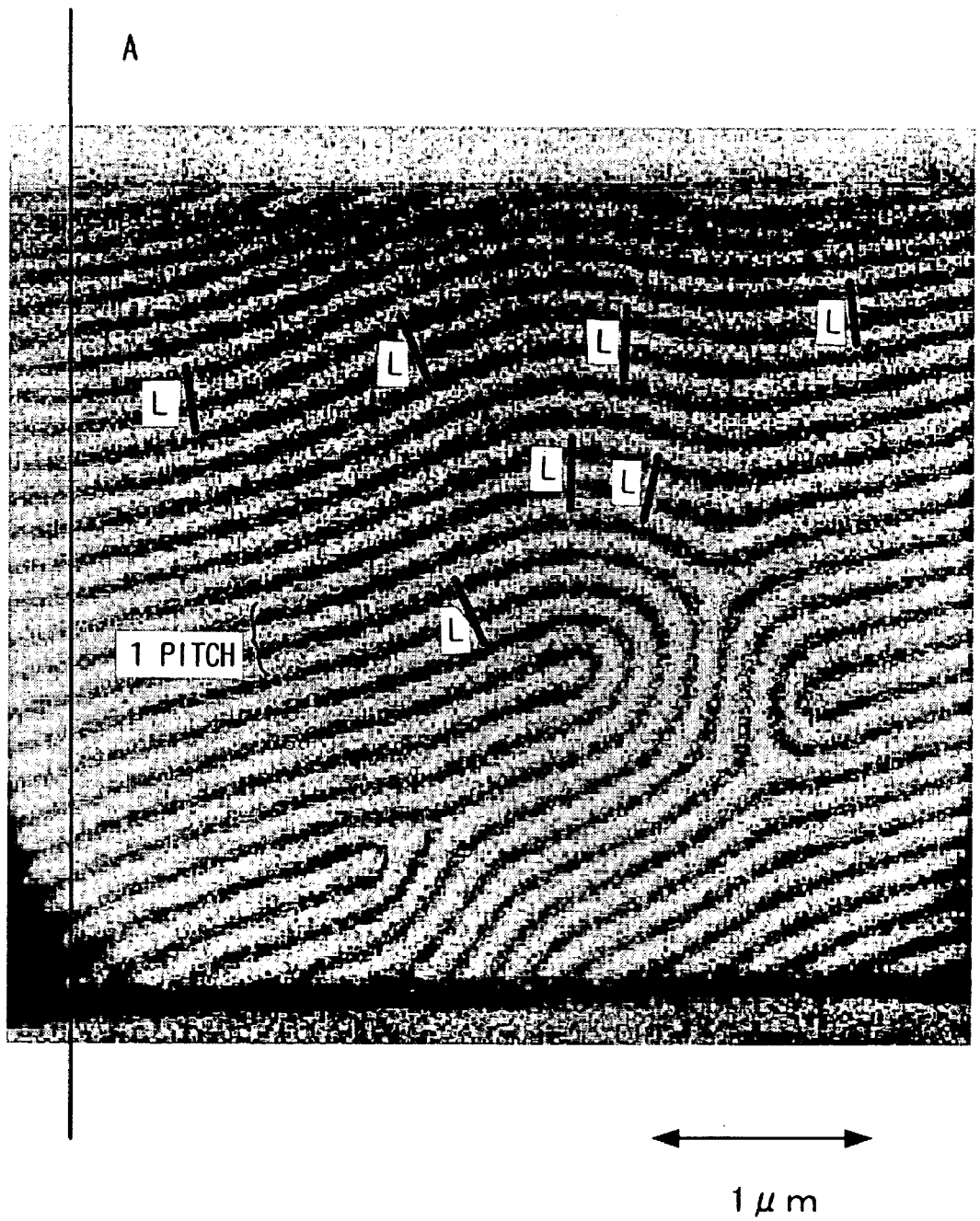
FIG. 5 is a photomicrograph showing another example of the sectional structure of the cholesteric liquid crystalline structure of the polarized-light selective reflection layer in the projection screen shown in FIG. 1.

A sectional TEM photo of the cholesteric liquid crystalline structure whose structure is as shown in FIG. 4 is shown in FIG. 5.

Specifically, in the cholesteric liquid crystalline structure of the polarized-light selective reflection layer 11 shown in FIGS. 4 and 5, it is preferable that the angles between the helical axes L in the helical-structure parts 30 and the normal A be from 0 to 45°, particularly from 0 to 30°. If these angles are greater than this range, the polarized-light selective reflection layer 11 cannot efficiently reflect incident light toward the viewer's side.

Further, it is preferable that the helical-structure parts 30 in which the helical axes L make angles in the above-described range with the normal A occupy 50% or more of the cholesteric liquid crystalline structure of the polarized-light selective reflection layer 11 shown in FIGS. 4 and 5. This is because if the helical-structure parts 30 in which the helical axes L make angles in the above-described range with the normal A occupy less than 50% of the cholesteric liquid crystalline structure, the polarized-light selective reflection layer 11 cannot reflect light at high efficiency, so that the image displayed on the projection screen 10 becomes darker.

The angle between the helical axis L in the helical-structure part 30 and the normal A can be determined from such a sectional TEM photo as is shown in FIG. 5, taken by a transmission electron photomicroscope. For example, this angle can be determined by measuring the angle between the helical axis L in the helical-structure part (the helical-structure part in which the helical length of liquid crystalline molecules is equal to one or more pitches) and the normal A in the photomicrograph. In FIG. 5, black-and-white lines indicate the planes of nematic layers, and the distance between a pair of these lines is equal to one helical pitch. The direction of the helical axis L is equal to the direction of the normal to these lines.

To form, in the cholesteric liquid crystalline structure of the polarized-light selective reflection layer 11, the helical-structure parts 30 in which the angles between the helical axes L and the normal A are in the above-described range, it is possible to use any method that can disturb the alignment of liquid crystalline molecules in the cholesteric liquid crystalline structure. Examples of methods useful herein include: a method in which a material that exerts aligning power not in one direction is used as the substrate 12 on which the polarized-light selective reflection layer 11 is formed; a method in which the content of a surface-active agent or leveling agent usually incorporated in the polarized-light selective reflection layer 11 is properly controlled; a method in which a polymerizable compound having no aligning power is incorporated in the polarized-light selective reflection layer 11; and any combination of these methods.

Preferably, the helical-structure parts 30 contained in the cholesteric liquid crystalline structure of the polarized-light selective reflection layer 11 have specific helical pitches so that the polarized-light selective reflection layer 11 can selectively reflect light in a specific wave range that covers only a part of the visible region (e.g., a wave range of 400 to 700 nm), that is, the polarized-light selective reflection layer 11 has, for light in a wave range that covers only a part of the visible region (e.g., a wave range of 400 to 700 nm), reflectivity not less than the maximum reflectivity of this layer. More specifically, it is preferable that the cholesteric liquid crystalline structure of the polarized-light selective reflection layer 11 has two or more discontinuously different helical pitches so that the polarized-light selective reflection layer 11 selectively reflects only light in a wave range that is identical to the wave range in which imaging light projected from a projector such as a liquid crystal projector falls. In general, a projector attains color display by using light in the wave ranges of red (R), green (G) and blue (B) colors, the three primary colors. Therefore, assuming that light enters the polarized-light selective reflection layer 11 vertically to it, it is preferable to determine the helical pitches in the cholesteric liquid crystalline structure so that the polarized-light selective reflection layer 11 selectively reflects light in wave ranges whose centers are between 430 nm and 460 nm, between 540 nm and 570 nm, and between 580 nm and 620 nm.

The wave ranges of 430 to 460 nm, 540 to 570 nm, and 580 to 620 nm that are used as the red (R), green (G) and blue (B) color wave ranges, respectively, are wave ranges commonly used for color filters, light sources, or the like for use in displays that produce white color by the three primary colors. Red (R), green (G) and blue (B) colors are shown as line spectra maximized at specific wavelengths (e.g., in the case of green (G) color, this wavelength is typically 550 nm). However, these line spectra have certain widths, and moreover, the projected light has wavelengths that vary depending upon the design of the projector, the type of the light source, and the like. It is, therefore, preferable that the wave range for each color has a width of 30 to 40 nm. If the red (R), green (G) and blue (B) color wave ranges are set outside the above-described respective ranges, it is impossible to produce pure white, and only yellowish or reddish white is obtained.

In the case where the red (R), green (G) and blue (B) color wave ranges are set as selective reflection wave ranges that are independent of one another, it is preferable that the cholesteric liquid crystalline structure of the polarized-light selective reflection layer 11 has three discontinuously different helical pitches. There is a case where the red (R) and green (G) color wave ranges are included in the selective reflection wave range corresponding to one helical pitch. In this case, it is preferable that the cholesteric liquid crystalline structure has two discontinuously different helical pitches.

Figure 6:
FIG. 6 is a diagrammatic sectional view showing a modification of the projection screen shown in FIG. 1.

To give two or more discontinuously different helical pitches in the cholesteric liquid crystalline structure of the polarized-light selective reflection layer 11, the polarized-light selective reflection layer 11 may be formed by laminating two or more partial selective reflection layers having different helical pitches. Specifically, as shown in FIG. 6, a partial selective reflection layer 11a that selectively reflects light in the blue (B) color wave range, a partial selective reflection layer 11b that selectively reflects light in the green (G) color wave range, and a partial selective reflection layer 11c that selectively reflects light in the red (R) color wave range may be successively layered from the substrate 12 side. The order in which the partial selective reflection layers 11a, 11b and 11c are layered is not necessarily limited to the above-described one. Each one of the partial selective reflection layers 11a, 11b and 11c shown in FIG. 6 has a cholesteric liquid crystalline structure adapted selectively to reflect a specific polarized light component (e.g., right-handed circularly polarized light), like the polarized-light selective reflection layer 11 shown in FIGS. 1 and 2A. Moreover, as a result of structural non-uniformity in the cholesteric liquid crystalline structure, each one of the partial selective reflection layer 11a, 11b and 11c diffuses the selectively reflected light.

It is preferable that the polarized-light selective reflection layer 11 (or the partial selective reflection layers 11a, 11b and 11c constituting the polarized-light selective reflection layer 11) be made to have such a thickness that the layer selectively reflects nearly 100% of the incident light in a specific state of polarization (such a thickness that the reflectance is saturated). When the polarized-light selective reflection layer 11 selectively reflects less than 100% of the specific polarized light component (e.g., right-handed circularly polarized light), the layer cannot efficiently reflect the imaging light. Although the reflectance of the polarized-light selective reflection layer 11 (or the partial selective reflection layers 11a, 11b and 11c constituting the polarized-light selective reflection layer 11) depends directly on the number of helixes, the reflectance depends indirectly on the thickness of the polarized-light selective reflection layer 11 if the helical pitch is fixed. Specifically, it is said that approximately 4 to 8 pitches are needed to obtain a reflectance of 100%. Therefore, the partial selective reflection layer 11a, 11b or 11c that reflects light in the red (R), green (G) or blue (B) color wave range is required to have a thickness of approximately 1 to 10 µm, although this thickness varies depending on the type of the components of the liquid crystalline composition used for forming this layer and on the selective reflection wave range of this layer. On the other hand, the partial selective reflection layers 11a, 11b and 11c should not be of unlimited thickness because if these layers are excessively thick, it becomes difficult to control the orientation of these layers, the layers cannot be made uniform, and the materials themselves for these layers absorb light to a greater extent. For this reason, it is appropriate that each partial selective reflection layer 11a, 11b or 11c has a thickness in the above-described range.

Figure 7:
FIG. 7 is a diagrammatic sectional view showing another modification of the projection screen shown in FIG. 1.

In order to increase adhesion between the polarized-light selective reflection layer 11 (or the partial selective reflection layers 11a, 11b and 11c constituting the polarized-light selective reflection layer 11) and the substrate 12, an adhesion-improving layer (intermediate layer) 28 may be provided between these two layers, as shown in FIG. 7. Any type of layer or any material is used for the adhesion-improving layer 28, and acrylic or epoxy materials may be used, for example.

Next, the details of the substrate 12 will be described below.

The substrate 12 is for supporting the polarized-light selective reflection layer 11, and a material selected from plastic films, metals, paper, cloth, glass, and the like can be used for forming the substrate 12.

It is preferable that the substrate 12 be or contain a light-absorbing layer adapted to absorb light in the visible region.

Specifically, for example, the substrate 12 (12A) may be made of a plastic film in which a black pigment is incorporated (e.g., a black PET film in which carbon is incorporated). In this case, the substrate 12 itself can also serve as a light-absorbing layer (light-absorptive substrate). Therefore, of the unpolarized light entering the projection screen 10 from the viewer's side, those lights that are inherently not reflected from the projection screen 10 as reflected light 33 (e.g., left-handed circularly polarized light 31L in the selective reflection wave range, and right-handed circularly polarized light 32R and left-handed circularly polarized light 32L not in the selective reflection wave range) and the light that enters the projection screen 10 from the backside are absorbed by the substrate 12. It is, therefore, possible effectively to prevent reflection of environmental light such as sunlight and light from lighting fixtures and production of stray light from imaging light.

Figure 8:
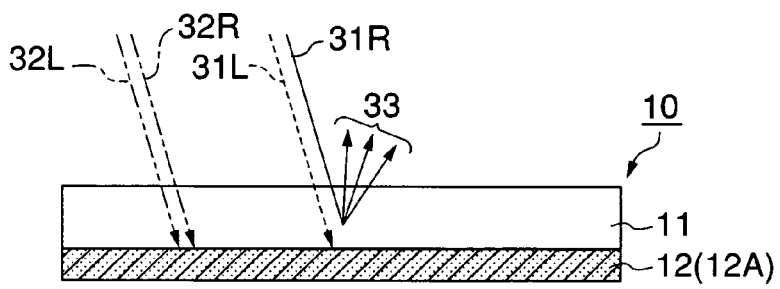
FIG. 8 is a diagrammatic sectional view showing a further modification of the projection screen shown in FIG. 1.
Figure 9:
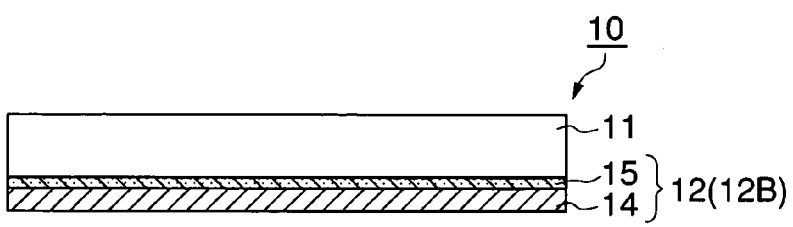
FIG. 9 is a diagrammatic sectional view showing a still further modification of the projection screen shown in FIG. 1.
Figure 10:
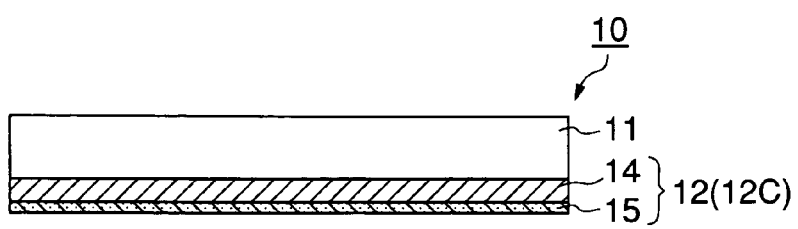
FIG. 10 is a diagrammatic sectional view showing yet another modification of the projection screen shown in FIG. 1.

The substrate 12 is not limited to the above-described substrate 12 (12A) shown in FIG. 8; the substrate may be such a substrate 12 (12B or 12C) as is shown in FIG. 9 or 10, in which a light-absorbing layer 15 containing a black pigment or the like is formed on one surface of a transparent base film 14 such as a plastic film.

To obtain a projection screen that can be rolled up, it is preferable to make the thickness of the substrate 12 between 15 μm and 300 μm, particularly between 25 μm and 100 μm. On the other hand, if the substrate 12 is not necessarily required to have flexibility as in the case where the resulting projection screen is used, for example, as a panel, there is no limitation on the thickness of the substrate 12.

Examples of plastic films that can be used as materials for the substrate 12 or base film 14 include films of such thermoplastic polymers as polycarbonate polymers, polyester polymers including polyethylene terephthalate, polyimide polymers, polysulfone polymers, polyether sulfone polymers, polystyrene polymers, polyolefin polymers including polyethylene and polypropylene, polyvinyl alcohol polymers, cellulose acetate polymers, polyvinyl chloride polymers, polyacrylate polymers, and polymethyl methacrylate polymers. Materials for the substrate 12 or base film 14 are not limited to the above-described ones, and materials such as metals, paper, cloth and glass also may be used.

Lamination of the polarized-light selective reflection layer 11 to the substrate 12 is usually conducted by applying a cholesteric liquid crystalline composition to the substrate 12 and then subjecting the applied layer to aligning treatment and curing treatment, as will be described later.

In the above-described lamination process, it is necessary that the cholesteric liquid crystalline structure of the polarized-light selective reflection layer 11 not be in the state of planar orientation. It is, therefore, preferable to use, as the substrate 12, a material whose surface to which the liquid crystalline composition will be applied has no aligning power.

However, even when a material whose surface to which the liquid crystalline composition will be applied has aligning power (e.g. a stretched film) is used, the cholesteric liquid crystalline structure of the polarized-light selective reflection layer 11 can be made not in the state of planar orientation if this surface of the material is subjected in advance to surface treatment, the components of the liquid crystalline composition are controlled, or the conditions under which the liquid crystalline composition is oriented are controlled.

Figure 11:
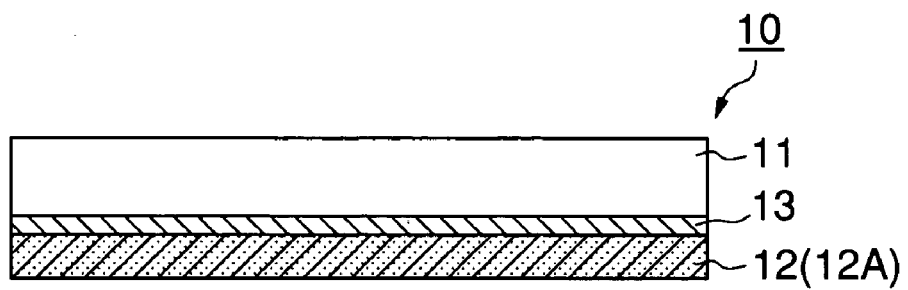
FIG. 11 is a diagrammatic sectional view showing another modification of the projection screen shown in FIG. 1.

Further, in the case where the surface of the substrate 12 to which the liquid crystalline composition will be applied has aligning power, such an intermediate layer 13 as an adherent layer may be provided between the polarized-light selective reflection layer 11 and the substrate 12 (12A), as shown in FIG. 11. By providing such an intermediate layer 13, it is possible to control the orientation of the cholesteric liquid crystalline structure of the polarized-light selective reflection layer 11, and to make the directors of liquid crystalline molecules in the cholesteric liquid crystalline structure of the polarized-light selective reflection layer 11, present in the vicinity of the surface of the intermediate layer 13, point in two or more different directions. By the use of the intermediate layer 13 (such as an adherent layer), it is also possible to increase the adhesion between the polarized-light selective reflection layer 11 and the substrate 12. Any material can be used for such an intermediate layer 13 as long as the material is highly adherent to both the polarized-light selective reflection layer 11 and the substrate 12; commercially available materials may be used. Specific examples of such materials include a PET film with an adherent layer "A4100" manufactured by Toyobo Co., Ltd., Japan, and adherent materials such as "AC-X", "AC-L" and "AC-W" manufactured by Panac Co., Ltd., Japan. A black pigment or the like may be incorporated in the intermediate layer 13 so that the intermediate layer 13 can also serve as a light-absorbing layer adapted to absorb light in the visible region, such as the substrate 12 (12A) shown in FIG. 8.

In the case where the surface of the substrate 12 has no aligning power and the adhesion between the polarized-light selective reflection layer 11 and the substrate 12 is satisfactorily high, it is not always necessary to provide the intermediate layer 13. To increase the adhesion between the polarized-light selective reflection layer 11 and the substrate 12, it is also possible to use a process-related method such as corona discharge treatment or UV cleaning.

A process of producing the above-described projection screen 10 will be described hereinafter.

The substrate 12 to which the polarized-light selective reflection layer 11 will be laminated is firstly prepared. If necessary, such an intermediate layer 13 as an adherent layer is laminated to the surface of the substrate 12 on the side on which the polarized-light selective reflection layer 11 will be provided. The surface of the substrate 12 (or, if an intermediate layer 13 is present, the surface of this layer) to which a liquid crystalline composition will be applied is made to have no aligning power.

Thereafter, a cholesteric liquid crystalline composition is applied to the above-prepared substrate 12 and is then subjected to aligning treatment and curing treatment, whereby the polarized-light selective reflection layer 11 is laminated (fixed) to the substrate 12.

The steps (the steps of application, alignment and curing) for laminating (fixing) the polarized-light selective reflection layer 11 to the substrate 12 will be described in detail hereinafter.

(Step of Application)

In the step of application, a cholesteric liquid crystalline composition is applied to the substrate 12 to form thereon a cholesteric liquid crystal layer. Any of the known methods can be employed to apply the liquid crystalline composition to the substrate 12. Specifically, a roll, gravure, bar, slide, die, slit, or dip coating method can be used for this purpose. In the case where a plastic film is used as the substrate 12, a film coating method using a so-called roll-to-roll system may be used.

For the liquid crystalline composition that is applied to the substrate 12, a chiral nematic liquid crystal or a cholesteric liquid crystal each having a cholesteric regularity may be used. Although any liquid crystalline material can be used as long as it can develop a cholesteric liquid crystalline structure, a particularly preferable one for obtaining, after curing, an optically stable polarized-light selective reflection layer 11 is a polymerizable liquid crystalline material having polymerizable functional groups at both ends of its molecule.

Explanations will be given below with reference to the case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material to make the resulting liquid crystalline composition cholesteric as a whole. A polymerization initiator and other proper additives are added to the liquid crystalline composition.

Examples of polymerizable, nematic liquid crystalline materials include compounds represented by the following general formulae (1) and (2-i) to (2-xi). These compounds may be used either singly or in combination.

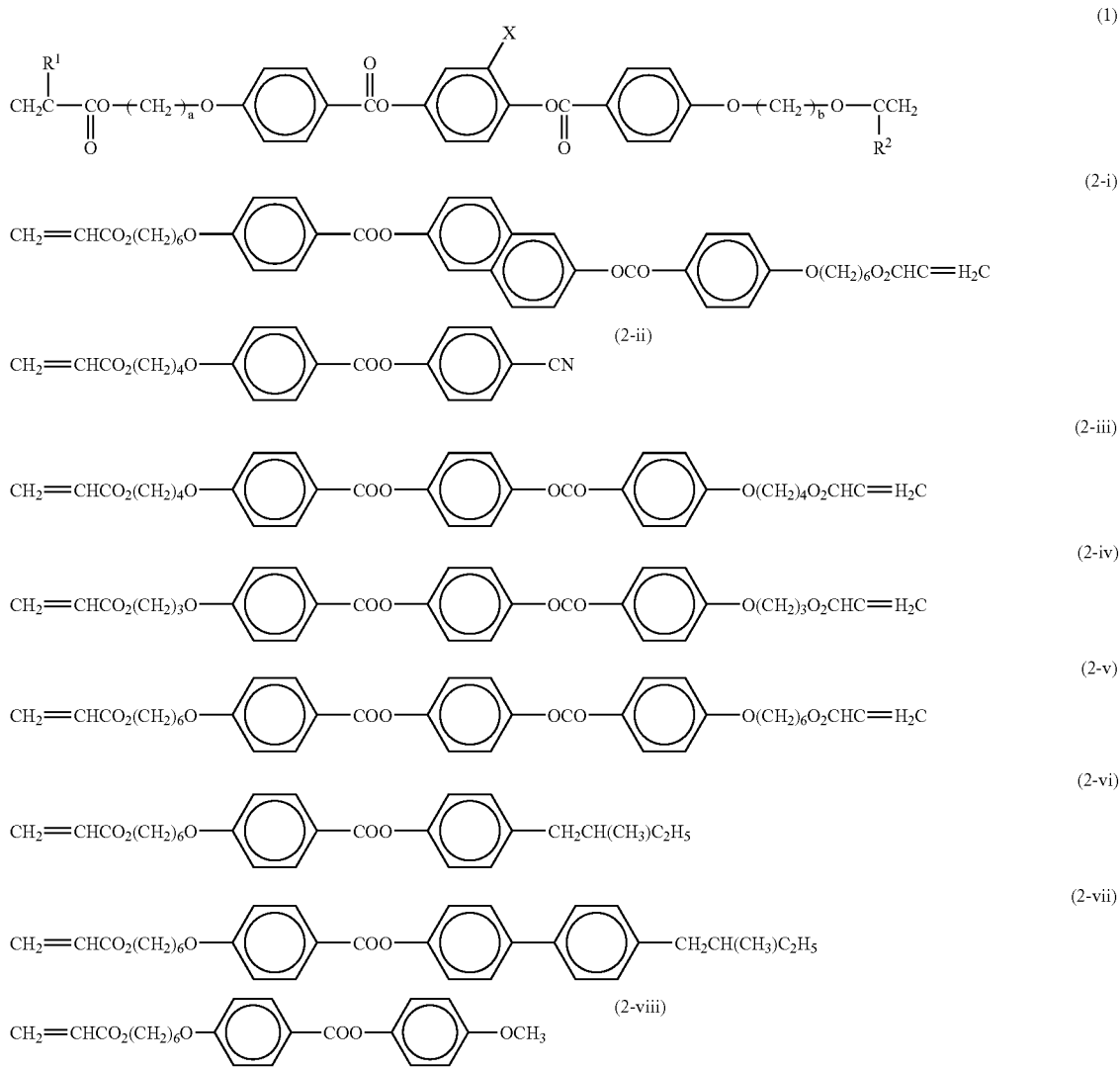

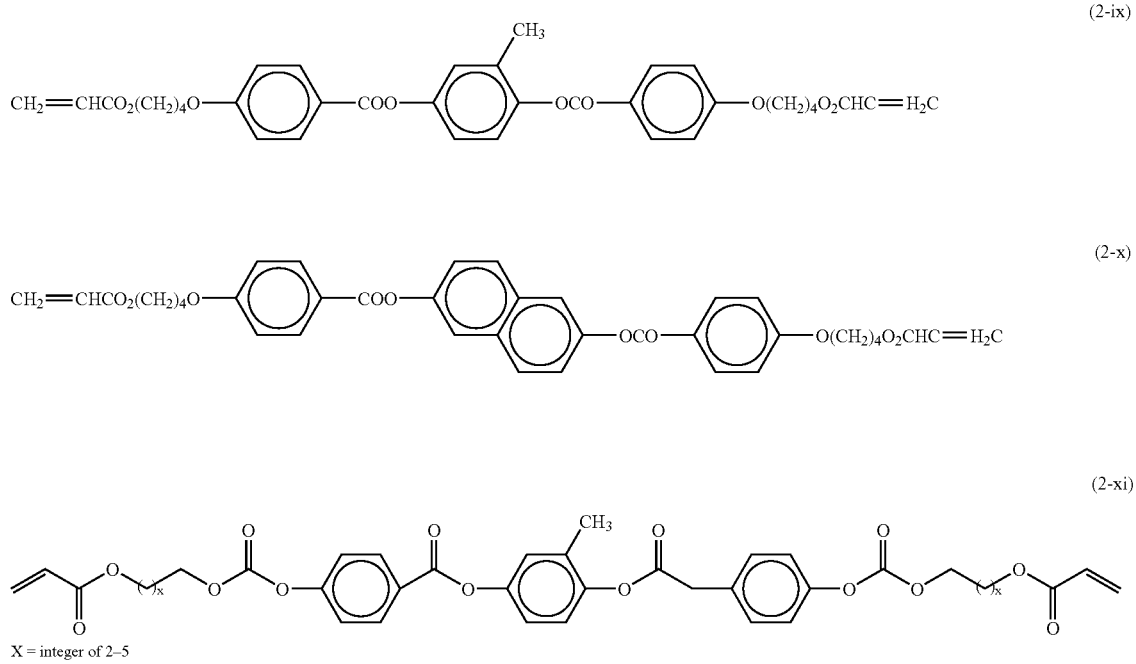

X = integer of 2–5

In the above general formula (1), $R^1$ and $R^2$ independently represent a hydrogen atom or a methyl group. It is, however, preferable that both $R^1$ and $R^2$ represent hydrogen atoms because a liquid crystalline composition containing such a compound shows a liquid crystal phase at temperatures in a wider range. X is any of hydrogen, chlorine, bromine, or iodine atoms, an alkyl group having 1 to 4 carbon atoms, methoxy group, cyano group or nitro group, preferably a chlorine atom or a methyl group. Further, in the above general formula (1), a and b that denote the chain lengths of the alkylene groups that serve as spacers between the (meth)acryloyloxy groups on both ends of the molecule and the aromatic rings are independently an integer of 2 to 12, preferably an integer of 4 to 10, more preferably an integer of 6 to 9. Those compounds represented by the general formula (1) in which a=b=0 are unstable, easily undergo hydrolysis, and have high crystallinity. On the other hand, those compounds represented by the general formula (1) in which a and b are independently an integer of 13 or more have low isotropic transition temperatures (TI's). Because these compounds show liquid crystal phases at temperatures in narrow ranges, they are undesirable.

Although a polymerizable liquid crystal monomer is, in the above description, used as the polymerizable, nematic liquid crystalline material, it is also possible to use, as the polymerizable, nematic liquid crystal material, a polymerizable liquid crystal oligomer or polymer, a liquid crystal polymer, or the like, properly selected from conventionally proposed ones.

On the other hand, the chiral agent is a low molecular weight compound containing an optically active site, having usually a molecular weight of not more than 1,500. The chiral agent is used in order to convert the positive monoaxially-nematic structure of a polymerizable, nematic liquid crystalline material into a helical structure. Any type of low molecular weight compounds may be used as the chiral agent as long as it is compatible with the polymerizable, nematic liquid crystalline material in the state of solution or melt and can make the liquid crystalline structure helical without impairing the liquid crystallinity of the material.

The chiral agent that is used for making the structure of the liquid crystal helical is required to have any type of chirality at least in its molecule helical is required to have any type of chirality at least in its molecule. Examples of chiral agents useful herein include those compounds having at least one asymmetric carbon atom; those compounds having asymmetric centers on hetero atoms, such as chiral amines or sulfoxides; and those axially chiral compounds having optically active sites, such as cumulene and binaphthol. More specific examples of chiral agents include commercially available chiral nematic liquid crystals such as a chiral dopant liquid crystal "S-811" manufactured by Merck KGaA.

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is a non-polymerizable one, the liquid crystalline composition has reduced hardenability, and the cured film is poor in reliability. Moreover, the use of a large amount of a chiral agent containing an optically active site increases the cost of the liquid crystalline composition. Therefore, to form a polarized-light selective reflection layer having a cholesteric structure with a short helical pitch, it is preferable to select, as the optically-active-site-containing chiral agent to be incorporated in the liquid crystalline composition, a chiral agent whose helical-structure-developing action is great. Specifically, it is preferable to use one of the compounds represented by the following general formulae (3), (4) and (5), which are low-molecular-weight compounds whose molecules are axially chiral.

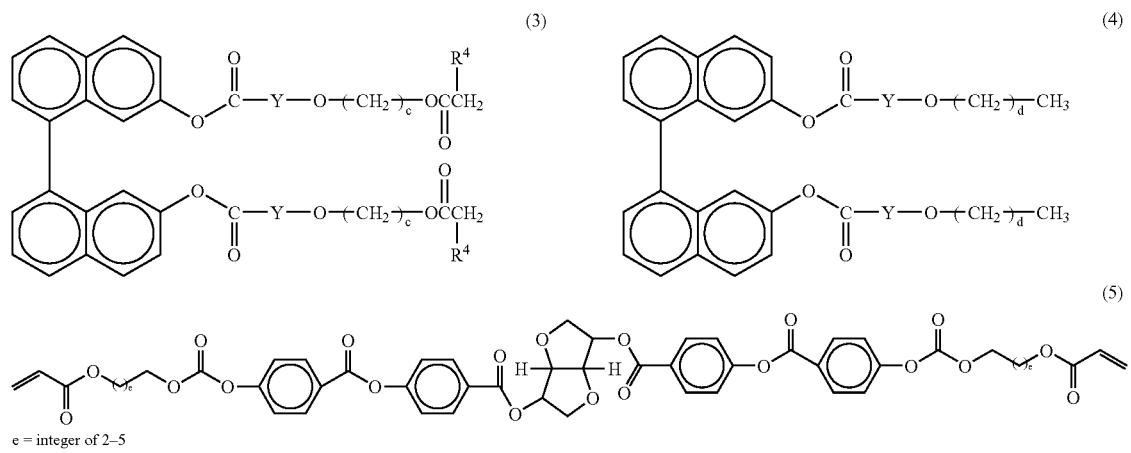

-continued

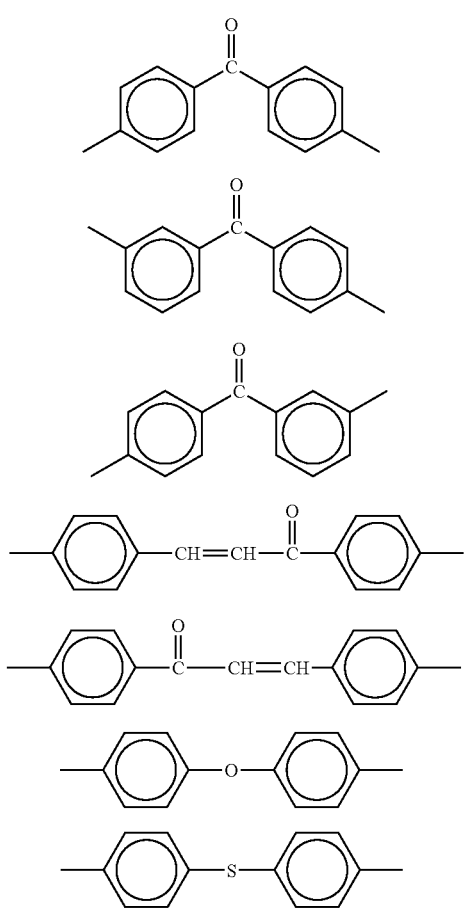

In the above general formulae (3) and (4), $R^4$ represents a hydrogen atom or a methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Those compounds represented by the above general formulae (3) and (4) in which c or d is 0 or 1 are poor in stability, easily undergo hydrolysis, and have high crystallinity. On the other hand, those compounds represented by the general formulae (3) and (4) in which c or d is 13 or more have low melting points (Tm's). These compounds are less compatible with the polymerizable, nematic liquid crystalline material, so that a liquid crystalline composition containing such a compound as the chiral agent may cause phase separation depending on the concentration of the compound.

The chiral agent is not necessarily polymerizable. However, if the chiral agent is polymerizable, it is polymerized with the polymerizable, nematic liquid crystalline material to give a stably fixed cholesteric structure. Therefore, from the viewpoint of thermal stability and the like, it is desirable that the chiral agent be polymerizable. In particular, the use of a chiral agent having polymerizable functional groups at both ends of its molecule is preferable to obtain a polarized-light selective reflection layer 11 excellent in heat resistance.

The content of the chiral agent in the liquid crystalline composition is optimally decided in consideration of the helical-structure-developing ability of the chiral agent, the cholesteric liquid crystalline structure of the resulting polarized-light selective reflection layer 11, and so forth. Although the amount of the chiral agent to be added greatly varies depending upon the components of the liquid crystalline composition, that amount is from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. In the case where the amount of the chiral agent added is smaller than this range, there is a possibility that the liquid crystalline composition cannot fully become cholesteric. On the other hand, when the amount of the chiral agent added exceeds the above-described range, the alignment of liquid crystalline molecules is impeded, and this undesired amount may adversely affect the liquid crystalline composition in the course of curing with activating radiation or the like.

Although the liquid crystalline composition can be applied as it is to the substrate 12, the composition may be dissolved in a suitable solvent such as an organic solvent to give an ink in order to make the viscosity of the liquid crystalline composition fit for an applicator or attain excellent alignment of liquid crystalline molecules.

Although any solvent can be used for the above purpose as long as it can dissolve the above-described polymerizable liquid crystalline material, it is preferable that the solvent does not attack the substrate 12. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted to any degree. However, considering that a liquid crystal itself is a material having low solubility and high viscosity, it is preferable to dilute the polymerizable liquid crystalline material to such a degree that the content of the liquid crystalline material in the diluted solution is in the order of preferably 5 to 50%, more preferably 10 to 30%.

(Step of Alignment)

After applying the liquid crystalline composition to the substrate 12 to form thereon a cholesteric liquid crystal layer in the above-described step of application, the cholesteric liquid crystal layer is, in the step of alignment, held at a predetermined temperature at which the cholesteric liquid crystal layer develops a cholesteric liquid crystalline structure, thereby aligning liquid crystalline molecules in the cholesteric liquid crystal layer.

The cholesteric liquid crystalline structure of the polarized-light selective reflection layer 11 that should be finally obtained in this embodiment is one not in the state of planar orientation but in such a state of orientation as is shown in FIGS. 2A, 3, 4 and 5, in which a plurality of helical-structure parts 30 that have different directions of helical axes L are present because of the existence of edge-shaped structures. Even so, it is necessary to conduct alignment treatment. Namely, although it is not necessary to align, in one direction on the substrate 12, the directors of liquid crystalline molecules in the cholesteric liquid crystalline structure, it is necessary to conduct an alignment treatment such that the plurality of helical-structure parts 30 are formed in the cholesteric liquid crystalline structure.

When the cholesteric liquid crystal layer formed on the substrate 12 is held at a predetermined temperature at which the cholesteric liquid crystal layer develops a cholesteric liquid crystalline structure, the layer shows a liquid crystal phase. At this time, as a result of to the self-accumulating action of liquid crystalline molecules themselves, continuous rotation of the directors of the liquid crystalline molecules occurs in the direction of the thickness of the layer, and a helical structure is produced. It is possible to fix this cholesteric liquid crystalline structure that is in a liquid crystal phase state by curing the cholesteric liquid crystal layer with a technique that will be described later.

In the case where the liquid crystalline composition applied to the substrate 12 contains a solvent, the step of alignment is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time (heating time) is preferably from 15 to 600 seconds, more preferably from 30 to 180 seconds. After once conducting the drying treatment, if it is realized that the liquid crystal layer is not fully orientated, this layer may be further heated accordingly. In the case where a vacuum drying technique is used in this drying treatment, it is preferable separately to conduct heat treatment in order to align liquid crystalline molecules.

(Step of Curing)

After aligning liquid crystalline molecules in the cholesteric liquid crystal layer in the above-described step of alignment, the cholesteric liquid crystal layer is cured in the step of curing, thereby fixing the cholesteric liquid crystalline structure that is in the liquid crystal phase state.

To effect the step of curing, it is possible to use: (1) a method in which the solvent contained in the liquid crystalline composition is evaporated; (2) a method in which liquid crystalline molecules in the liquid crystalline composition are thermally polymerized; (3) a method in which liquid crystalline molecules in the liquid crystalline composition are polymerized by the application of radiation; or (4) any combination of these methods.

Of the above methods, method (1) is suitable for the case where a liquid crystal polymer is used as the polymerizable, nematic liquid crystalline material that is incorporated in the liquid crystalline composition for forming the cholesteric liquid crystal layer. In this method, the liquid crystal polymer is dissolved in a solvent such as an organic solvent, and this solution is applied to the substrate 12. In this case, a solidified, cholesteric liquid crystal layer can be obtained by simply removing the solvent by drying. The type of the solvent, the drying conditions, and so on are the same as those ones that are used in the aforementioned steps of application and alignment.

The above-described method (2) is for curing the cholesteric liquid crystal layer by thermally polymerizing by heating liquid crystalline molecules in the liquid crystalline composition. In this method, the state of bonding of the liquid crystalline molecules varies according to the heating (baking) temperature. Therefore, if the liquid crystal layer is heated unevenly, the cured layer cannot be uniform in physical properties such as film hardness and in optical properties. In order to limit variations in film hardness to ±10%, it is preferable to control the heating temperature so that it varies only within ±5%, particularly ±2%.

Any method may be employed to heat the cholesteric liquid crystal layer formed on the substrate 12 as long as the method can provide uniformity in heating temperature. The liquid crystal layer may be placed directly on a hot plate and held as it is, or placed indirectly on a hot plate with a thin air layer interposed between the liquid crystal layer and the hot plate and held in parallel with the hot plate. Moreover, a method using a heater capable of heating the whole of a particular space, such as an oven, may be employed, where the liquid crystal layer is placed in or passed through such a heater. If a film coater or the like is used, it is preferable to make the drying zone long enough to make the heating time sufficiently long.

The required heating temperature is usually as high as 100° C. or more. However, considering the heat resistance of the substrate 12, it is preferable to limit this temperature to below approximately 150° C. If a specialized film or the like having significantly high heat resistance is used as the substrate 12, the heating temperature can be made as high as 150° C. or more.

The above-described method (3) is for curing the cholesteric liquid crystal layer by photo-polymerizing liquid crystalline molecules in the liquid crystalline composition by the application of radiation. In this method, electron beams, ultraviolet rays, or the like suitable for the conditions can be used as the radiation source. In general, ultraviolet light is preferred because of the simplicity of ultraviolet light irradiation systems. The wavelength of ultraviolet light useful herein is from 250 to 400 nm. If ultraviolet light is used, it is preferable to incorporate a photopolymerization initiator in the liquid crystalline composition in advance.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyldiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In addition to the photopolymerization initiator, sensitizers and leveling agents may be added to the liquid crystalline composition unless they hinder the attainment of the object of the present invention.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

By varying the contents of the above-described components in the liquid crystalline composition, the helical-structure parts 30 that have different directions of helical axes L as a result of the existence of the edge-shaped structures and the like can be formed in the cholesteric liquid crystalline structure of the polarized-light selective reflection layer 11. Specifically, for example, a large amount of a surface-active agent may be incorporated in the liquid crystalline composition to disturb the alignment of liquid crystalline molecules on the surface of the cholesteric liquid crystal structure; and a large amount of a photopolymerization initiator may be incorporated in the liquid crystalline composition to make the chain lengths of liquid crystalline molecules in the cholesteric liquid crystalline structure short. In the latter case, the photopolymerization initiator remaining even after the completion of reaction serves as an impurity that disturbs the alignment of the liquid crystalline molecules in the cholesteric liquid crystalline structure. Further, the alignment of the liquid crystalline molecules in the cholesteric liquid crystalline structure may also be disturbed by the addition of a polymerizable compound having no liquid crystalline orientation to the liquid crystalline composition. Furthermore, the orientation of the cholesteric liquid crystal may be disturbed by the addition of finely divided particles to the liquid crystalline composition. The alignment of the liquid crystalline molecules in the cholesteric liquid crystalline structure may also be disturbed by the combined use of the above methods. The types and amounts of these additives can be properly selected depending on the purpose of addition of the additives.

A projection screen 10 including the polarized-light selective reflection layer 11 that is composed of a single cholesteric liquid crystal layer can be obtained by conducting a series of the above-described steps (the steps of application, alignment and curing). It is also possible to obtain a projection screen 10 having a polarized-light selective reflection layer 11 that contains a plurality of cholesteric liquid crystal layers by repeating a series of the above-described steps. Namely, by repeating the above-described steps, it is possible to produce a projection screen 10 in which a partial selective reflection layer 11a that selectively reflects light in the blue (B) color wave range, a partial selective reflection layer 11b that selectively reflects light in the green (G) color wave range, and a partial selective reflection layer 11c that selectively reflects light in the red (R) color wave range are layered successively from the substrate 12 side to constitute a polarized-light selective reflection layer 11, as shown in FIG. 6.

In the process of making such a multi-layered, polarized-light selective reflection layer 11, as long as the underlying cholesteric liquid crystal layer has been solidified, a liquid crystalline composition for forming the next cholesteric liquid crystal layer can be applied by using the same technique as in the formation of the first liquid crystal layer. In this case, there is continuity between the cholesteric liquid crystalline structure (the state of orientation) of the upper cholesteric liquid crystal layer and the cholesteric liquid crystalline structure of the lower cholesteric liquid crystal layer. It is, therefore, unnecessary to provide an alignment-controlling layer or the like between these two cholesteric liquid crystal layers. However, an intermediate layer such as an adherent layer may be provided between these two cholesteric liquid crystal layers, as needed. The conditions for the steps of application, alignment, and curing in the formation of the second and later cholesteric liquid crystal layers and the materials for forming these liquid crystal layers are as mentioned above, so that explanations for them are omitted here.

Thus, according to this embodiment, the projection screen 10 includes the polarized-light selective reflection layer 11 having a cholesteric liquid crystalline structure and adapted selectively reflect a specific polarized light component and to diffuse the selectively reflected light as a result of structural non-uniformity in the cholesteric liquid crystalline structure.

Due to the polarized-light-separating property of the cholesteric liquid crystalline structure, the polarized-light selective reflection layer 11 selectively reflects only a specific polarized light component (e.g., right-handed circularly polarized light), so that the layer can be made to reflect only approximately 50% of the unpolarized environmental light such as sunlight and light from light fixtures that are incident on this layer. For this reason, while retaining the brightness of the light-indication part such as a white-indication part, it is possible to make the brightness of the dark-indication part such as a black-indication part nearly half, thereby enhancing image contrast to approximately twice. In this case, if the imaging light to be projected is made to contain mainly a polarized light component (e.g., right-handed circularly polarized light) that is identical to the polarized light component that the polarized-light selective reflection layer 11 selectively reflects, the polarized-light selective reflection layer 11 can reflect nearly 100% of the imaging light projected on this layer, that is, the polarized-light selective reflection layer 11 can efficiently reflect the imaging light.

Further, the polarized-light selective reflection layer 11 has a cholesteric liquid crystalline structure that is structurally non-uniform; this cholesteric liquid crystalline structure contains the helical-structure parts 30 that have different directions of helical axes L and that are formed because of, for example, the existence of the edge-shaped-structure parts in the layered-structure area in which the planes of nematic layers are layered. Therefore, the polarized-light selective reflection layer 11 reflects the imaging light not by specular reflection but by diffuse reflection, so that the reflected light can be well recognized as an image. At this time, because of structural non-uniformity in the cholesteric liquid crystalline structure, the polarized-light selective reflection layer 11 diffuses the selectively reflected light. Therefore, while diffuse-reflecting a specific polarized light component (e.g., right-handed circularly polarized light 31R in the selective reflection wave range), the polarized-light selective reflection layer 11 transmits the other light components (e.g., left-handed circularly polarized light 31L in the selective reflection wave range, and right-handed circularly polarized light 32R and left-handed circularly polarized light 32L not in the selective reflection wave range). For this reason, the environmental light and the imaging light that pass through the polarized-light selective reflection layer 11 do not undergo the previously-mentioned "depolarization." It is thus possible to improve image visibility while retaining the polarized-light-separating property of the polarized-light selective reflection layer 11.

Figure 12:
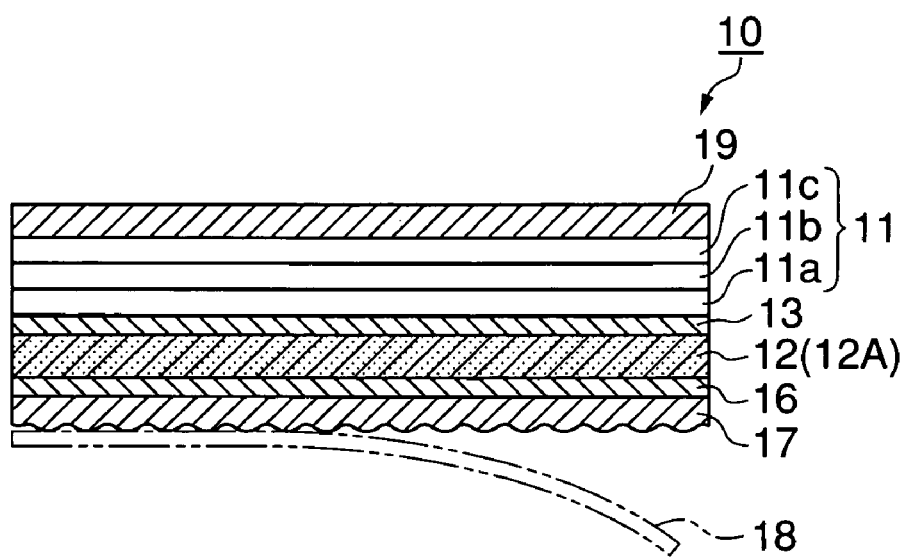
FIG. 12 is a diagrammatic sectional view showing a further modification of the projection screen shown in FIG. 1.

In the projection screen 10 according to this embodiment, a light-reflecting layer 16 for reflecting light incident on the substrate 12 may be provided on the side of the substrate 12 opposite to the side on which the polarized-light selective reflection layer 11 is provided, as shown in FIG. 12. If the substrate 12 contains a light-absorbing layer in the manner shown in FIGS. 8 to 10, environmental light such as sunlight and light from lighting fixtures that enter the projection screen 10 from the backside are effectively reflected before reaching the substrate 12 (especially the light-absorbing layer contained in the substrate 12), so that it is possible effectively to suppress heat generation of the substrate 12. Preferable examples of materials that can be used as the light-reflecting layer 16 include white-colored scattering layers (paper, white-colored films, coatings, etc.), metallic plates, and films made from aluminum powder.

Further, as shown in FIG. 12, a pressure sensitive adhesive layer 17 useful for affixing, to an external member, the substrate 12 on which the polarized-light selective reflection layer 11 is formed may be provided on the side of the substrate 12 opposite to the side on which the polarized-light selective reflection layer 11 is provided (on the backside of the light-reflecting layer 16 in FIG. 12). If a pressure sensitive adhesive layer 17 is so provided, the projection screen 10 can be affixed to an external member such as a white board or wall, if necessary. The pressure sensitive adhesive layer 17 is preferably a layer that can make the substrate 12 on which the polarized-light selective reflection layer 11 is provided separably adhere to an external member. It is, therefore, preferable to use, as the pressure sensitive adhesive layer 17, a pressure sensitive adhesive film with slight tackiness such as a removable, pressure sensitive adhesive film manufactured by Panac Co., Ltd., Japan. Moreover, it is preferable to cover the surface of the pressure sensitive adhesive layer 17 with a releasing film 18 in order to protect the pressure sensitive adhesive layer 17 before use.

Furthermore, as shown in FIG. 12, a functional layer 19 may be provided on the viewer's side surface of the polarized-light selective reflection layer 11. A variety of layers including hard coat (HC) layers, anti-glaring (AG) layers, anti-reflection (AR) layers, ultraviolet-absorbing (UV-absorbing) layers, and antistatic (AS) layers can be used as the functional layer 19.

The hard coat layer is for preventing the surface of the projection screen 10 from being scratched or stained. The anti-glaring layer is for preventing the projection screen 10 from glaring. The anti-reflection layer is for preventing the projection screen 10 from reflecting light. The ultraviolet-absorbing layer is for absorbing ultraviolet light that enters the projection screen 10. The antistatic layer is for preventing the projection screen 10 from being electrostatically charged. In the case where the antistatic layer is used as the functional layer 19, this layer is not necessarily provided on the viewer's side surface of the polarized-light selective reflection layer 11 and can be provided on the back surface of the substrate 12. Moreover, carbon particles or the like may be incorporated in the substrate 12 so that the substrate 12 itself has the function of eliminating static electricity.

The hard coat, anti-glaring, anti-reflection, ultraviolet-absorbing and antistatic layers, as the functional layers 19, will be described in detail hereinafter.

(Hard Coat Layer)

The hard coat layer is a member for preventing the surface of the projection screen 10 from being scratched or stained and is provided on the outermost, viewer's side surface of the polarized-light selective reflection layer 11. The hard coat layer can have any surface hardness as long as the layer can protect the projection screen 10 from damages such as scratches. It is, however, preferable that the surface hardness of the hard coat layer expressed by the pencil hardness according to JIS K5400 be 2H or more, particularly 4H or more. As long as the surface hardness is in this range, the hard coat layer can satisfactorily improve the scratch resistance of the projection screen 10 and protect the surface of the projection screen 10 from scratches at the time when the projection screen 10 is rolled up for storage.

In addition to the function of preventing the surface of the projection screen 10 from being scratched, the hard coat layer that is provided on the outermost, viewer's side surface of the polarized-light selective reflection layer 11 may have other functions. It is preferable that these other functions include at least one of the following functions: the function of preventing the projection screen 10 from glaring; the function of preventing the projection screen 10 from reflecting light; the function of absorbing ultraviolet light that enters the projection screen 10; and the function of preventing the projection screen 10 from being electrostatically charged. In other words, in the case where provided on the outermost, viewer's side surface of the polarized-light selective reflection layer 11 are an anti-glaring layer for preventing the projection screen 10 from glaring, an anti-reflection layer for preventing the projection screen 10 from reflecting light, an ultraviolet-absorbing layer for absorbing ultraviolet light that enters the projection screen 10, and an antistatic layer for preventing the projection screen 10 from being electrostatically charged, if the function of protecting the surface of the projection screen 10 is imparted to these layers by controlling their hardness, there can be obtained: a hard coat layer having the function of preventing glaring; a hard coat layer having the function of preventing reflection of light; a hard coat layer having the function of absorbing ultraviolet light; and a hard coat layer having the function of preventing static electrification.

To the hard coat layer, the function of absorbing ultraviolet light and the function of preventing static electrification may be imparted together with either the function of preventing glaring or the function of preventing reflection of light. Examples of hard coat layers having these functions are as follows: (1) a hard coat layer having the function of preventing glaring and the function of absorbing ultraviolet light; (2) a hard coat layer having the function of preventing reflection of light and the function of absorbing ultraviolet light; (3) a hard coat layer having the function of preventing glaring and the function of preventing static electrification; (4) a hard coat layer having the function of preventing reflection of light and the function of preventing static electrification; (5) a hard coat layer having the function of preventing glaring, the function of absorbing ultraviolet light and the function of preventing static electrification; and (6) a hard coat layer having the function of preventing reflection of light, the function of absorbing ultraviolet light and the function of preventing static electrification.

By thus imparting other functions to the hard coat layer, there can be efficiently obtained a high-quality projection screen 10 having a simple structure.

Examples of materials useful for forming such a hard coat layer include thermosetting resins, thermoplastic resins, ultraviolet-curing resins, electron-beam-curing resins, and two-part resins. Of these, ultraviolet-curing resins are preferred because it is possible to form easily hard coat layers from such resins by simply conducting curing treatment with ultraviolet light.

Examples of ultraviolet-curing resins useful herein include polyester, acrylic, urethane, amide, silicone and epoxy monomers, oligomers and polymers. Of these, urethane monomers, oligomers and polymers are preferred. More specifically, ultraviolet-curing resins having ultraviolet-polymerizable functional groups, especially those ultraviolet-curing resins having 2 or more, particularly 3 to 6, ultraviolet-polymerizable functional groups in one molecule are preferred.

Finely divided particles may be incorporated in the hard coat layer in order to control its hardness. Any of various transparent materials such as metallic oxides, glass and plastics can be used as the finely divided particles without limitation. Specific examples of finely divided particles useful herein include: electrically-conductive, inorganic finely divided particles such as silica, alumina, titania, zirconia, calcium oxide, tin oxide, indium oxide, cadmium oxide and antimony oxide; cross-linked or non-cross-linked, organic finely divided particles made from various polymers such as polymethyl methacrylate, polystyrene, polyurethane, acryl-styrene copolymers, benzoguanamine, melamine and polycarbonate; and silicone finely divided particles.

The finely divided particles may be in any shape: they may be in spherical bead shape or in amorphous powdery shape. One type, or two or more types, of finely divided particles selected properly may be used. The mean particle diameter of the finely divided particles is between 1 µm and 10 μm, preferably between 2 μm and 5 μm. In the finely divided particles, ultrafine particles of metallic oxides or the like may be dispersed or incorporated in order to control refractive index or to impart electrical conductivity.

The content of the finely divided particles in the hard coat layer is properly determined taking into consideration the mean particle diameter of the finely divided particles, the thickness of the hard coat layer, and so forth. In general, however, the content of the finely divided particles is preferably from 1 to 20 parts by weight, particularly from 5 to 15 parts by weight, for 100 parts by weight of the resin that is used for the formation of the hard coat layer.

In addition to the finely divided particles, other additives such as photopolymerization initiators, leveling agents, thixotropic agents, ultraviolet light absorbers, and antistatic agents may be incorporated in the hard coat layer.

A method usually employed to form such a hard coat layer is as follows: the above-described materials are dissolved or dispersed in a proper solvent to give a hard-coat-layer-forming coating liquid, and this coating liquid is applied to the polarized-light selective reflection layer 11 formed on the substrate 12 and then dried and cured. Examples of solvents for use in the hard-coat-layer-forming coating liquid include toluene, ethyl acetate, butyl acetate, methyl ethyl ketone, methyl isobutyl ketone, isopropyl alcohol, and ethyl alcohol. To apply the hard-coat-layer-forming coating liquid, any one of the known methods may be used. Specifically, a roll, gravure, bar, slide, die, slit or dip coating method can be employed. Further, in the case where a plastic film is used as the substrate 12, a film coating method using a so-called roll-to-roll system may be used.

The thickness of the hard coat layer is preferably between 0.1 μm and 100 μm, particularly between 1 μm and 10 μm. When the hard coat layer has a thickness smaller than this range, there is a possibility that the function of preventing the surface of the projection screen 10 from being scratched cannot be satisfactorily obtained, and, if the hard coat layer also has other functions such as the function of preventing reflection of light, these functions may not be fully obtained. On the other hand, when the hard coat layer has a thickness greater than the above-described range, although these functions can be satisfactorily obtained, there is a possibility that the hard coat layer impedes transmission of imaging light projected from a projector to lower brightness.

(Anti-Glaring Layer)

The anti-glaring layer is a member for preventing the projection screen 10 from glaring and is provided on the viewer's side of the polarized-light selective reflection layer 11. It is possible to provide the anti-glaring layer by roughening the surface of the hard coat layer formed in the above-described manner, for example.

(Anti-Reflection Layer)

The anti-reflection layer is a member for preventing the projection screen 10 from reflecting light and is provided on the viewer's side of the polarized-light selective reflection layer 11. It is possible to provide the anti-reflection layer by subjecting the surface of the hard coat layer formed in the above-described manner to treatment for imparting, to this surface, the property of preventing reflection of extraneous light, for example.

(Ultraviolet-Absorbing Layer)

The ultraviolet-absorbing layer is a member for absorbing ultraviolet light that enters the projection screen 10 and is provided on the viewer's side of the polarized-light selective reflection layer 11. The ultraviolet-absorbing layer contains an ultraviolet light absorber and can prevent the polarized-light selective reflection layer 11 from being adversely affected by ultraviolet light that enters the projection screen 10. Specifically, for example, in the case where the polarized-light selective reflection layer 11 is made from a cholesteric liquid crystalline composition, the ultraviolet-absorbing layer can prevent the liquid crystalline composition from yellowing that occurs when affected by ultraviolet light, and the polarized-light selective reflection layer 11 can thus have improved weatherability. It is preferable that the ultraviolet-absorbing layer absorbs 90% or more, more preferably 95% or more, of the ultraviolet light that enters the projection screen 10. As long as the ultraviolet-absorbing layer can absorb ultraviolet light to such an extent, the polarized-light selective reflection layer 11 can show excellent weatherability.

In addition to the function of absorbing ultraviolet light that enters the projection screen 10, the ultraviolet-absorbing layer that is provided on the viewer's side of the polarized-light selective reflection layer 11 may have other functions. It is preferable that these other functions include at least one of the following functions: the function of preventing the surface of the projection screen 10 from being scratched; the function of preventing the projection screen 10 from glaring; the function of preventing the projection screen 10 from reflecting light; and the function of preventing the projection screen 10 from being electrostatically charged. In other words, in the case where provided on the viewer's side of the polarized-light selective reflection layer 11 are a hard coat layer for preventing the surface of the projection screen 10 from being scratched, an anti-glaring layer for preventing the projection screen 10 from glaring, an anti-reflection layer for preventing the projection screen 10 from reflecting light, and an antistatic layer for preventing the projection screen 10 from being electrostatically charged, if an ultraviolet light absorber is incorporated in these layers, there can be obtained: an ultraviolet-absorbing layer having the function of protecting the surface of the projection screen 10; an ultraviolet-absorbing layer having the function of preventing glaring; an ultraviolet-absorbing layer having the function of preventing reflection of light; and an ultraviolet-absorbing light layer having the function of preventing static electrification.

To such an ultraviolet-absorbing layer, the function of protecting the surface of the projection screen 10 and the function of preventing static electrification may be imparted together with either the function of preventing glaring or the function of preventing reflection of light. Examples of ultraviolet-absorbing layers having these functions are as follows: (1) an ultraviolet-absorbing layer having the function of protecting the surface of the projection screen 10 and the function of preventing glaring; (2) an ultraviolet-absorbing layer having the function of protecting the surface of the projection screen 10 and the function of preventing reflection of light; (3) an ultraviolet-absorbing layer having the function of preventing glaring and the function of preventing static electrification; (4) an ultraviolet-absorbing layer having the function of preventing reflection of light and the function of preventing static electrification; (5) an ultraviolet-absorbing layer having the function of protecting the surface of the projection screen 10, the function of preventing glaring, and the function of preventing static electrification; and (6) an ultraviolet-absorbing layer having the function of protecting the surface of the projection screen 10, the function of preventing reflection of light, and the function of preventing static electrification.

Thus, if other functions are imparted to the ultraviolet-absorbing layer, a high-quality projection screen 10 having a simple structure can be obtained at high efficiency.

Any ultraviolet light absorber may be used to form the ultraviolet-absorbing layer as long as it has the property of absorbing ultraviolet light. However, to ensure sufficient absorption of ultraviolet light, those ultraviolet light absorbers that are excellent in the absorption of ultraviolet light of 370 nm or shorter, and, from the viewpoint of image display performance, scarcely absorb visible light of 400 nm or more are preferred.

Specifically, salicylate, benzophenone, benzotriazole, benzoate, cyanoacrylate, or nickel-complex ultraviolet light absorbers may be used, for example. Of these, benzophenone, benzotriazole or salicylate ultraviolet light absorbers are preferred.

Examples of benzophenone ultraviolet light absorbers include 2,4-dihydroxybenzophenone, 2-hydroxy-4-acetoxybenzophenone, 2-hydroxy-4-methoxybenzophenone, 2,2'-dihydroxy-4-methoxybenzophenone, 2,2'-dihydroxy-4,4'-methoxybenzophenone, 2-hydroxy-4-n-octoxybenzophenone, 2-hydroxy-4-dodecyloxybenzophenone, and 2-hydroxy-4-(2-hydroxy-3-methacryloxy)propoxybenzophenone.

Examples of benzotriazole ultraviolet light absorbers include 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amyl-phenyl)benzotriazole, 2(2'-hydroxy-3',5'-di-tert-butylphenyl)-5-chlorobenzotriazole, and 2(2'-hydroxy-5'-tert-octylphenyl)benzotriazole.

Examples of salicylate ultraviolet light absorbers include phenyl salicylate, p-octylphenyl salicylate, and p-tert-butylphenyl salicylate.

Of the above-enumerated ultraviolet light absorbers, 2-hydroxy-4-methoxybenzophenone, 2,2'-dihydroxy-4,4'-methoxybenzophenone, 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amyl-phenyl)benzotriazole, and 2(2'-hydroxy-3',5'-di-tert-butylphenyl)-5-chlorobenzotriazole are preferred.

Any type of ultraviolet light absorbers can be used in this aspect of the invention. Moreover, it is possible to use a mixture of two or more different types of ultraviolet light absorbers. The use of such a mixture can produce a powerful shielding effect on ultraviolet light in a wider wave range.

The amount of the ultraviolet light absorber to be incorporated in the ultraviolet-absorbing layer is preferably from 1 to 50 parts by weight, particularly from 5 to 40 parts by weight, for 100 parts by weight of the binder resin used for forming the ultraviolet-absorbing layer. If the ultraviolet-absorbing layer contains an ultraviolet light absorber in an amount smaller than the above range, the layer cannot fully show the function of absorbing ultraviolet light. On the other hand, If the ultraviolet-absorbing layer contains an ultraviolet light absorber in an amount greater than the above range, the ultraviolet light absorber tends to bleed through the surface of the ultraviolet-absorbing layer.

Examples of the binder resin to which the ultraviolet light absorber is added include phenoxy resins, vinyl resins, polyester resins, polystyrene resins, polyamide resins, polyurethane resins, and acrylic resins.

A method usually used to form such an ultraviolet-absorbing layer is as follows: the above-described materials are dissolved or dispersed in a proper solvent to give an ultraviolet-absorbing-layer-forming coating liquid, and this coating liquid is applied to the polarized-light selective reflection layer 11 formed on the substrate 12 and then dried and cured. Any ultraviolet-absorbing-layer-forming coating liquid can be used in the above method as long as the liquid contains the above-described ultraviolet light absorber, binder resin, etc. dissolved or dispersed in a proper solvent. Examples of solvents that can be used in the ultraviolet-absorbing-layer-forming coating liquid include toluene, ethyl acetate, butyl acetate, methyl ethyl ketone, methyl isobutyl ketone, isopropyl alcohol and ethyl alcohol. To apply the ultraviolet-absorbing-layer-forming coating liquid, any one of the known methods may be employed. Specifically, a roll, gravure, bar, slide, die, slit or dip coating method can be used. In the case where a plastic film is used as the substrate 12, a film coating method using a so-called roll-to-roll system may be used.

The thickness of the ultraviolet-absorbing layer is preferably between 0.1 μm and 5 μm, particularly between 1 μm and 3 μm. When the ultraviolet-absorbing layer has a thickness smaller than this range, there is a possibility that the function of absorbing ultraviolet light cannot be satisfactorily obtained, and, if this layer also has other functions such as the function of preventing reflection of light, these functions may not be satisfactorily obtained. On the other hand, when the ultraviolet-absorbing layer has a thickness greater than the above-described range, although these functions can be satisfactorily obtained, the ultraviolet-absorbing layer may impede transmission of imaging light projected from a projector, and the brightness thus dims.

(Antistatic Layer)

The antistatic layer is a member for preventing the projection screen 10 from being electrostatically charged and is provided at least on either the viewer's side or the backside surface of the polarized-light selective reflection layer 11. The antistatic layer can have any surface resistivity as long as the layer can eliminate the static electricity produced on the projection screen 10. It is, however, preferable that the surface resistivity of the antistatic layer be not more than $1 \times 10^{11}$ Ω/□. As long as the antistatic layer has a surface resistivity in this range, the layer can satisfactorily prevent static electrification of the projection screen 10. If the antistatic layer is provided on the viewer's side surface of the polarized-light selective reflection layer 11, the surface of the projection screen 10 does not produce static electricity that draws dust. On the other hand, if provided on the back surface of the polarized-light selective reflection layer 11, the antistatic layer can prevent discharge of static electricity to a human body. Moreover, this antistatic layer can prevent deformation of the projection screen 10 that is caused when the projection screen 10 is attracted to a wall or furniture by static electricity in the case where the projection screen 10 is in the form of a roll screen, for example. Of course, it is possible to provide the antistatic layer on both the viewer's side and the backside surfaces of the polarized-light selective reflection layer 11. If the antistatic layer is provided on both sides of the polarized-light selective reflection layer 11, the static electrification of the projection screen 10 is more satisfactorily prevented. The antistatic layer is usually provided on the outermost, viewer's side or backside surface of the projection screen 10. This arrangement is used because, if the antistatic layer is so provided, those troubles that are caused by static electricity can be more effectively avoided.

In addition to the function of preventing the projection screen 10 from being electrostatically charged, the antistatic layer that is provided at least on the viewer's side or backside surface of the polarized-light selective reflection layer 11 may have other functions. It is preferable that these other functions include at least one of the following functions: the function of preventing the surface of the projection screen 10 from being scratched, the function of preventing the projection screen 10 from glaring, the function of preventing the projection screen 10 from reflecting light, and the function of absorbing ultraviolet light that enters the projection screen 10. In other words, in the case where provided on the viewer's side of the polarized-light selective reflection layer 11 are a hard coat layer for preventing the surface of the projection screen 10 from being scratched and staining, an anti-glaring layer for preventing the projection screen 10 from glaring, an anti-reflection layer for preventing the projection screen 10 from reflecting light, and an ultraviolet-absorbing layer for absorbing ultraviolet light that enters the projection screen 10, if an antistatic agent or the like is incorporated in these layers, there can be obtained: an antistatic layer having the function of protecting the surface of the projection screen 10; an antistatic layer having the function of preventing glaring; an antistatic layer having the function of preventing reflection of light; and an antistatic layer having the function of absorbing ultraviolet light.

The function of protecting the surface of projection screen 10 and the function of absorbing ultraviolet light may be imparted to such an antistatic layer together with either the function of preventing glaring or the function of preventing reflection of light. Examples of antistatic layers having these functions are as follows: (1) an antistatic layer having the function of protecting the surface of the projection screen 10 and the function of preventing glaring; (2) an antistatic layer having the function of protecting the surface of the projection screen 10 and the function of preventing reflection of light; (3) an antistatic layer having the function of preventing glaring and the function of absorbing ultraviolet light; (4) an antistatic layer having the function of preventing reflection of light and the function of absorbing ultraviolet light; (5) an antistatic layer having the function of protecting the surface of the projection screen 10, the function of preventing glaring, and the function of absorbing ultraviolet light; and (6) an antistatic layer having the function of protecting the surface of the projection screen 10, the function of preventing reflection of light, and the function of absorbing ultraviolet light.

Thus, if other functions are imparted to the antistatic layer, there can be obtained, at high efficiency, a high-quality projection screen 10 having a simple structure.

To form such an antistatic layer, one of the following methods may be employed: (1) a method in which a metal or metallic oxide having antistatic properties is deposited or applied; (2) a method in which a silicate compound is applied; or (3) a method in which an antistatic-layer-forming coating liquid containing an antistatic agent is applied. In these methods (1) to (3), any one of the known methods may be employed to apply the various materials. Specifically, a roll, gravure, bar, slide, die, slit or dip coating method can be used. In the case where a plastic film is used as the substrate 12, a film coating method using a so-called roll-to-roll system may be used.

Specifically, any metal or metallic oxide can be used in method (1) as long as the metal or metallic oxide has a surface resistivity sufficiently low that the resulting layer has antistatic properties. Examples of metals or metallic oxides useful herein include such metals as tin, aluminum, silicon, copper, silver, gold and indium, and oxides or double oxides of these metals. In the case where the antistatic layer is provided on the viewer's side of the polarized-light selective reflection layer 11, it is preferable that this layer be transparent. From this point of view, it is preferable to deposit indium oxide or silica.

From the same reason, the above-described method (2) using silicate compounds, which are highly transparent, preferably is employed to form the antistatic layer.

In the above-described method (3), any antistatic agent can be used as long as it can make the surface resistivity of the resulting antistatic layer low enough to prevent static electrification. Examples of antistatic agents that can be used in this method include a variety of surface-active agent type antistatic agents such as: various cationic antistatic agents including quaternary ammonium salts, pyridinium salts, and those agents having cationic groups such as primary, secondary or tertiary amino groups; anionic antistatic agents having anionic groups such as sulfonic acid base, sulfuric ester base, phosphoric ester base and phosphonic acid base; amphoteric antistatic agents such as amino-acid- or amino-sulfuric-ester-containing agents; and nonionic antistatic agents such as aminoalcohol-, glycerin- or polyethylene-glycol-containing agents.

The antistatic layer formed by method (3) includes a layer containing an antistatic agent as a main component, and a layer containing a proper binder resin to which an antistatic agent is added. In the latter case, any binder resin can be used as long as it is highly transparent and does not impair the antistatic properties of the antistatic agent. If such a function as the function of protecting the surface of the projection screen 10, the function of preventing glaring, the function of preventing reflection of light, or the function of absorbing ultraviolet light is imparted to the antistatic layer, a resin material or the like useful for forming a layer having such a function is usually used as the binder resin. Specifically, for example, to form an antistatic layer having the function of protecting the surface of the projection screen 10, any of thermosetting resins, thermoplastic resins, ultraviolet-curing resins, electron-beam-curing resins and two-part resins may be used as the binder resin. To obtain an antistatic layer having the function of absorbing ultraviolet light, any of phenoxy resins, vinyl resins, polyester resins, polystyrene resins, polyamide resins, polyurethane resins, acrylic resins, etc. may be used as the binder resin.

In the case where the antistatic layer is formed by adding an antistatic agent in a binder resin or the like, the content of the antistatic agent in the antistatic layer is preferably from 1 to 50% by weight, particularly from 5 to 20% by weight. When the content of the antistatic agent is lower than this range, the antistatic layer may not have a fully lowered surface resistivity. On the other hand, when the content of the antistatic agent is higher than the above-described range, the antistatic layer may have a poor appearance and a lowered heat distortion temperature.

The antistatic layer can have any surface resistivity as long as it can prevent static electrification of the projection screen 10. However, the surface resistivity of the antistatic layer is preferably $1 \times 10^{11}$ $\Omega/\square$ or less, particularly $1 \times 10^{10}$ $\Omega/\square$ or less, more preferably $1 \times 10^9$ $\Omega/\square$ or less. As long as the antistatic layer has a surface resistivity in the above range, the layer can prevent generation of static electricity, so that the projection screen 10 is prevented from being electrostatically charged and thus from being covered with dust. The above-described surface resistivity is the value obtained by moisture-conditioning a sample in an atmosphere of 23° C. and 50% RH for 24 hours and measuring the surface resistivity of this sample in accordance with ASTM D257, using a super megohmmeter.

The thickness of the antistatic layer is preferably from 0.5 to 5 μm, particularly from 1 to 2 μm. If the antistatic layer has a thickness smaller than this range, the function of preventing static electrification of the projection screen 10, and other functions such as the function of preventing glaring, if imparted, may not be satisfactorily obtained. On the other hand, if the antistatic layer has a thickness greater than the above-described range, although these functions can be satisfactorily obtained, the antistatic layer may impede transmission of imaging light projected from a projector, and the brightness thus dims.

(Combination of Functional Layers)

Some of or all of the above-described functions, that is, the function of protecting the surface of the projection screen 10, the function of preventing glaring, the function of preventing reflection of light, the function of absorbing ultraviolet light, and the function of preventing static electrification can be imparted to one layer, as mentioned above. Alternatively, these functions may be imparted to separate layers, and these separate layers may be layered on the polarized-light selective reflection layer 11. Specifically, for example, the anti-reflection layer, the anti-glaring layer, the ultraviolet-absorbing layer and the hard coat layer may be layered on the polarized-light selective reflection layer 11 in the order mentioned. Although it is necessary that the hard coat layer be provided on the outermost, viewer's side surface of the projection screen 10, the other layers may be layered in any order. The ultraviolet-absorbing layer is not necessarily a single layer, and a plurality of ultraviolet-absorbing layers may be provided. For example, by incorporating an ultraviolet light absorber in any two or more of the anti-reflection layer, the anti-glaring layer and the hard coat layer, it is possible to provide a plurality of ultraviolet-absorbing layers. Although the antistatic layer is provided on the viewer's side or backside surface of the polarized-light selective reflection layer 11, it is preferable not to provide this layer on the viewer's side of the anti-reflection layer, for example. This arrangement is preferred because if the antistatic layer is provided on the viewer's side of the anti-reflection layer, the function of the anti-reflection layer, that is, the function of preventing reflection of extraneous light, may be impaired.

Projection System

Figure 13:
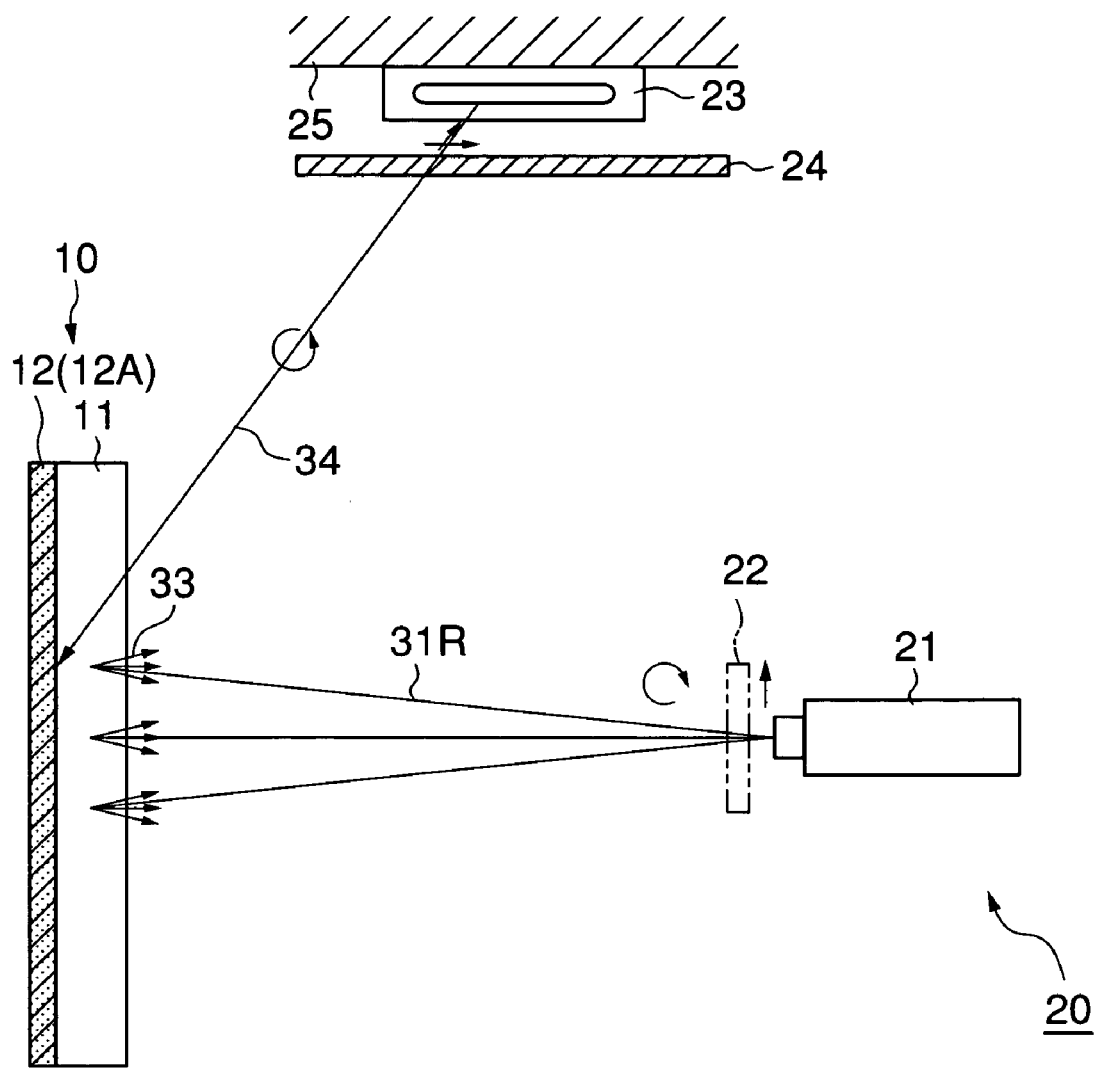
FIG. 13 is a diagrammatic view showing an example of a projection system comprising a projection screen according to an embodiment of the present invention.

The aforementioned projection screen 10 can be incorporated into a projection system 20 having a projector 21, as shown in FIG. 13.

As shown in FIG. 13, the projection system 20 includes the projection screen 10 and the projector 21 for projecting imaging light on the projection screen 10.

Of these components, the projector 21 may be of any type, and it is possible to use a CRT projector, a liquid crystal projector, a DLP (digital light processing) projector, or the like. It is, however, preferable that the imaging light to be projected on the projection screen 10 from the projector 21 contains chiefly a polarized light component (e.g., right-handed circularly polarized light) that is identical with the polarized light component that the projection screen 10 selectively reflects.

A liquid crystal projector useful as the projector 21 usually emits substantially linearly polarized light because of the operating principle of this projector. In this case, by letting the imaging light emerge from the projector 21 through a retardation layer 22 or the like, it is possible to convert the linearly polarized light into circularly polarized light without loss of the amount of light.

A quarter wave plate is preferable as the retardation layer 22. Specifically, an ideal retardation layer is one capable of causing a phase shift of 137.5 nm for light with a wavelength of 550 nm at which visibility is maximized. Further, a wide-wave-range quarter wave plate is more preferable because this wave plate is applicable to light in all of the red (R), green (G) and blue (B) color wave ranges. It is also possible to use a single retardation layer made by controlling the birefringence of a material for this layer, or a retardation layer using a quarter wave plate in combination with a half wave plate.

The retardation layer 22 may be externally attached to the exit aperture of the projector 21, as shown in FIG. 13, or incorporated into the inside of the projector 21.

In the case where a CRT or DLP projector is used as the projector 21, because the projector emits unpolarized light, it is necessary to provide a circular polarizer composed of a linear polarizer and a retardation layer in order to convert the unpolarized light into circularly polarized light. If a circular polarizer is provided, although the amount of light emitted from the projector 21 itself is decreased to half, stray light or the like is not produced from a polarized light component (e.g., left-handed circularly polarized light) that is different from the polarized light that the polarized-light selective reflection layer 11 in the projection screen 10 selectively reflects, so that image contrast is enhanced.

A projector 21 usually attains color display utilizing light in the wave ranges for red (R), green (G) and blue (B) colors, the three primary colors. For example, assuming that light enters the projection screen 10 vertically to it, the projector 21 projects light in wave ranges whose centers are between 430 nm and 460 nm, between 540 nm and 570 nm, and between 580 nm and 620 nm. For this reason, it is preferable to make the projection screen 10 selectively reflect only light in wave ranges identical to the wave ranges in which the imaging light projected from the projector 21 fall. If the projection screen 10 is so made, of the environmental light such as sunlight and light from lighting fixtures, those lights in the visible region not in the above-described wave ranges are not reflected at the projection screen 10, so that image contrast is enhanced.

The projection system 20 usually includes an illuminant 23 that is fixed to an illuminant-fixing position 25 such as the ceiling of a room, and this illuminant 23 illuminates a space in which the projection screen 10 is placed.

As shown in FIG. 13, in the case where the illuminant 23 is so positioned that the light emitted from the illuminant 23 illuminates directly the projection screen 10, it is preferable that the light 34 emitted from the illuminant 23 toward the projection screen 10 be made to contain mainly a polarized light component (e.g., left-handed circularly polarized light) that is different from the polarized light component that the projection screen 10 selectively reflects. By so making the light 34, it is possible effectively to prevent the polarized-light selective reflection layer 11 in the projection screen 10 from reflecting the light 34, thereby enhancing image contrast.

The state of polarization of the light 34 that is emitted from the illuminant 23 can be controlled by providing, in the vicinity of the illuminant 23, a polarizer film 24 capable of transmitting left-handed circularly polarized light. It is herein possible to use, as the polarizer film 24, an absorption circular polarizer or a polarized-light separator (reflection circular polarizer). Examples of polarized-light separators useful herein include: circularly-polarized-light separators using cholesteric liquid crystal layers; and linearly-polarized-light separators containing, on the exit side, retardation layers for converting linearly polarized light into circularly polarized light. Such polarized-light separators are preferred because they cause only a small loss of the amount of light as compared to absorption circular polarizers.

Figure 14:
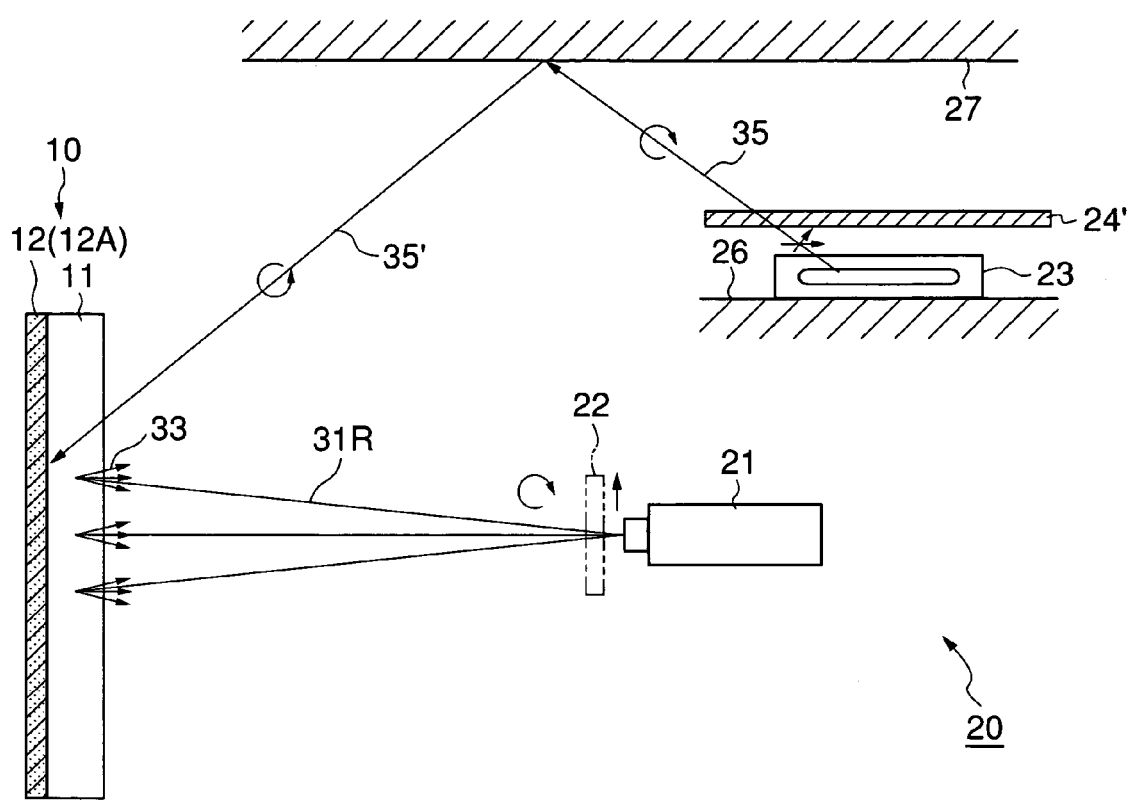
FIG. 14 is a diagrammatic view showing another example of a projection system comprising a projection screen according to an embodiment of the present invention.

In the projection system 20 shown in FIG. 13, the light 34 emitted from the illuminant 23 illuminates directly the projection screen 10. The present invention is not limited to this arrangement and also includes the case where the illuminant 23 is, as shown in FIG. 14, mounted on an illuminant-mounting position 26 other than the ceiling so that the light 35 emitted from the illuminant 23 illuminates, as light 35', indirectly the projection screen 10 via a reflector 27 such as the ceiling. In this case, the state of polarization of the circularly polarized light is reversed when the light is reflected at the reflector 27. It is, therefore, preferable that the light 35 emitted from the illuminant 23 toward the reflector 27 be made to contain mainly a polarized light component (e.g., right-handed circularly polarized light) that is identical to the polarized light component that the projection screen 10 selectively reflects, by providing a polarizer film 24' or the like that transmits right-handed circularly polarized light, as in the case shown in FIG. 13. The polarizer film 24' may be the same as the above-described polarizer film 24. If such a polarizer film is used, the light 35' whose state of polarization has been reversed by the reflector 27 is to contain mainly a polarized light component (e.g., left-handed circularly polarized light) that is different from the polarized light component that the projection screen 10 selectively reflects. For this reason, the light 35' is not reflected from the polarized-light selective reflection layer 11 in the projection screen 10, and image contrast is thus enhanced.

EXAMPLES

The present invention will now be explained more specifically by referring to the following examples. However, these examples are not intended to limit or restrict the scope of the invention in any way.

Example 1

A first cholesteric liquid crystal solution having a selective reflection wave range centered at 440 nm was prepared by dissolving, in cyclohexanone, a monomer-containing liquid crystal consisting of a main component (94.7% by weight), an ultraviolet-curing nematic liquid crystal, and a polymerizable chiral agent (5.3% by weight). A liquid crystal containing a compound represented by the above chemical formula (2-xi) was used as the nematic liquid crystal. A compound represented by the above chemical formula (5) was used as the polymerizable chiral agent. To the first cholesteric liquid crystal solution, 5% by weight of "Irg 369" available from Ciba Specialty Chemicals K.K., Japan was added as a photopolymerization initiator.

By a bar coating method, the above-prepared first cholesteric liquid crystal solution was applied to a substrate ("LUMIRROR/AC-X" manufactured by Panac Co., Ltd., Japan) that was a black-colored PET film with a surface area of 200 mm×200 mm, having thereon an adherent layer.

This resulting layer was subjected to an aligning treatment (drying treatment) by heating in an oven at 80° C. for 90 seconds, whereby a cholesteric liquid crystal layer containing no solvent was obtained.

Thereafter, 50 mW/cm$^2$ of ultraviolet light with a wavelength of 365 nm was applied to this cholesteric liquid crystal layer in an atmosphere of nitrogen for one minute to cure the cholesteric liquid crystal layer. Thus, a first partial selective reflection layer having a selective reflection wave range centered at 440 nm was obtained.

Similarly, a second cholesteric liquid crystal solution was applied directly to the first partial selective reflection layer and then subjected to alignment treatment (drying treatment) and curing treatment. Thus, a second partial selective reflection layer having a selective reflection wave range centered at 550 nm was obtained. The procedure used for preparing the second liquid crystal solution was the same as the procedure used for preparing the first liquid crystal solution, provided that the nematic liquid crystal and the chiral agent were mixed in such a proportion that the resulting layer had a selective reflection wave range centered at 550 nm.

Similarly, a third cholesteric liquid crystal solution was applied directly to the second partial selective reflection layer and then subjected to alignment treatment (drying treatment) and curing treatment. Thus, a third partial selective reflection layer having a selective reflection wave range centered at 600 nm was obtained. The procedure used for. preparing the third liquid crystal solution was the same as the procedure used for preparing the first liquid crystal solution, provided that the nematic liquid crystal and the chiral agent were mixed in such a proportion that the resulting layer had a selective reflection wave range centered at 600 nm.

Thus, there was obtained a projection screen having a polarized-light selective reflection layer composed of the first partial selective reflection layer capable of selectively reflecting light in the blue (B) color wave range (light in a selective reflection wave range centered at 440 nm), the second partial selective reflection layer capable of selectively reflecting light in the green (G) color wave range (light in a selective reflection wave range centered at 550 nm), and the third partial selective reflection layer capable of selectively reflecting light in the red (R) color wave range (light in a selective reflection wave range centered at 600 nm) layered in the order mentioned successively from the substrate side. The first partial selective reflection layer was 3 μm thick, the second partial selective reflection layer was 4 μm thick, and the third partial selective reflection layer was 5 μm thick. These partial selective reflection layers constituting the polarized-light selective reflection layer in the projection screen had cholesteric liquid crystalline structures that were not in the state of planar orientation.

From a photomicrograph of the sectional structure taken by a transmission electron photomicroscope (a sectional TEM photo), 10 edge-shaped-structure parts were observed in the cross section with a base length of 100 μm and a height of 1 μm. Moreover, both those helical-structure parts in which the helical axes were tilted clockwise at an angle of 10° with the normal and those helical-structure parts in which the helical axes were tilted counterclockwise at an angle of 10° with the normal were confirmed to be present in this cross section. Used for these observations was a specimen obtained by slicing the polarized-light selective reflection layer embedded in an epoxy resin and subjecting this slice to double staining; a "JEM-200CX" transmission electron photomicroscope manufactured by JEOL, Ltd., Japan was also used.

The polarized-light selective reflection layer in the projection screen obtained in the above-described manner was found to have an angle of diffusion of ±30°. The "angle of diffusion" herein refers to the measured angle at which the reflectivity is equal to ⅓ of the maximum reflectivity (excluding reflectivity originating from interfacial reflection), obtained by projecting light on a projection screen at an angle of 30° with respect to the normal of the screen and measuring the angle at which this light is back-scattered, where the measured angle at which the reflectivity reaches a maximum is 0°.

Example 2

"ADEKA Optomer KRX-559-7" manufactured by ASAHI DENKA KOGYO K.K., Japan was prepared as a material for forming a hard coat layer, and was applied, by a bar coating method, directly to the polarized-light selective reflection layer in the projection screen obtained in Example 1. This coating film was dried at 80° C. for 5 minutes and was then cured by the application of 750 mJ/cm$^2$ of ultraviolet light, thereby forming a hard coat layer with a thickness of 5 μm. There was thus obtained a projection screen containing the hard coat layer laminated to the polarized-light selective reflection layer. The surface hardness of the hard coat layer in the projection screen obtained in this manner was measured. As a result, the pencil hardness of the hard coat layer determined in accordance with JIS K5400 was found to be 2H or more.

Example 3

"ZR-100 (trade name)" manufactured by Sumitomo Osaka Cement Co., Ltd., Japan was prepared as a material for forming an ultraviolet-absorbing layer, and was applied, by a spin coating method, directly to the polarized-light selective reflection layer in the projection screen obtained in Example 1. This coating film was dried at 80° C. for 1 minute, thereby obtaining an ultraviolet-absorbing layer whose thickness was approximately 2 μm. Thus, there was obtained a projection screen in which the ultraviolet-absorbing layer was laminated to the polarized-light selective reflection layer.

Example 4

A xylene solution (solid matter 30%) containing polyacrylic ester as a binder and tin oxide in an amount of 30% of the binder was prepared as a material for forming an antistatic layer, and was applied, by a bar coating method, directly to the polarized-light selective reflection layer in the projection screen obtained in Example 1. This coating film was dried at 80° C. and was then cured by the application of 100 mJ/cm$^2$ of ultraviolet light, thereby obtaining an antistatic layer with a thickness of 1 μm. Thus, there was obtained a projection screen containing the antistatic layer laminated to the polarized-light selective reflection layer. The surface resistivity of the antistatic layer in the projection screen obtained in this manner was $1 \times 10^{11}$ Ω/□.

Comparative Example 1

A projection screen was produced in the same manner as in Example 1, provided that a stretched, black-colored PET film ("LUMIRROR" manufactured by Panac Co., Ltd., Japan) was used as the substrate. The surface of the polarized-light selective reflection layer in the projection screen obtained in this manner was found to be in the state of planar orientation. The partial selective reflection layers constituting the polarized-light selective reflection layer were found to have cholesteric liquid crystalline structures that were also in the state of planar orientation.

Comparative Example 2

A commercially available projection screen manufactured by OS Co., Ltd., Japan, composed of cloth and a beads-containing scattering layer formed on the cloth surface, was prepared.

(Results of Evaluation)

Imaging light emitted from a projector was projected on each one of the projection screens of Example 1 and Comparative Examples 1 and 2, and the contrast values were determined. In this measurement, a liquid crystal projector ("ELP-52" manufactured by Seiko Epson Corporation, Japan) was used as the projector.

In order to convert the imaging light emitted from the projector into circularly polarized light, a circular polarizer was placed on the exit aperture of the projector. A fluorescent lamp (emitting unpolarized light) fixed to the ceiling was used to illuminate the room in which the projector and each projection screen were placed, where the projection screen and the fluorescent lamp were arranged so that the light from the fluorescent light directly entered the projection screen at an angle of approximately 50°. The illumination intensity on the projection screen right under the fluorescent lamp, measured by an illuminometer (a digital illuminometer "510-02" manufactured by Yokogawa M&C Corporation, Japan), was 200 lx.

The projection screen was set vertically to the floor. The projector was placed at such a point that the horizontal distance (in parallel with the floor) between the projector and the projection screen was approximately 2.5 m.

Imaging light (a still image composed of white and black areas) was projected on the projection screen from the projector, and the image contrast was determined. Specifically, the luminance of the white area and that of the black area in the center of the projection screen were measured by a luminance meter "BM-8" manufactured by Topcon Corp., Japan, and the ratio between these two luminances was obtained as the image contrast [contrast=(luminance of white area)÷(luminance of black area)].

The contrast values of the images projected on the projection screens of Example 1 and Comparative Examples 1 and 2 are shown in Table 1.

Further, these projection screens were observed visually. On the projection screen of Comparative Example 1, because specular reflection of the projected light occurred, it was difficult to recognize the reflected light as an image and it was impossible to measure the luminances. The images displayed on the projection screens of Example 1 and Comparative Example 2 were well recognizable; however, the contrast of the image on the projection screen of Example 1 was approximately 8 times higher than the contrast of the image on the projection screen of Comparative Example 2.

TABLE 1

| Sample | Example 1 | Comparative Ex. 1 | Comparative Ex. 2 |
|---|---|---|---|
| Contrast | 30 | — | 4 |

On the other hand, the projection screens of Examples 1 and 2 were subjected to abrasion tests. Compared with the projection screen of Example 1, the projection screen of Example 2 was scarcely scratched.

The projection screens of Examples 1 and 3 were subjected to 200-hour weatherability tests using a weatherometer ("SLLM-U" manufactured by Suga Test Instruments Co., Ltd., Japan). The image projected on each projection screen was observed before and after the test. As a result, the image projected on the projection screen of Example 3, observed after the test, was found to be the same in color tone as the image observed before the test, and in this respect, this projection screen was superior to the projection screen of Example 1.

The projection screens of Examples 1 and 4 were left to stand for 24 hours. Compared with the projection screen of Example 1, the projection screen of Example 4 was scarcely covered with dust.

What is claimed is:

1. A projection screen that displays an image by reflecting projected imaging light, the screen comprising:
   a polarized-light selective reflection layer having a cholesteric liquid crystalline structure and adapted to selectively reflect a specific polarized light component,
   wherein the polarized-light selective reflection layer selectively reflects the light component while diffusing the light component as a result of structural non-uniformity in the cholesteric liquid crystalline structure;
   the cholesteric liquid crystalline structure of the polarized-light selective reflection layer comprises a plurality of helical-structure parts that have different directions of helical axes; and
   the cholesteric liquid crystalline structure of the polarized-light selective reflection layer comprises a layered-structure area in which planes of nematic layers are layered and edge-shaped-structure parts that are formed in the layered-structure area by a partial edge dislocation of the planes of nematic layers, and the plurality of helical-structure parts that have different directions of helical axes that are obtained by directions of helical axes of the cholesteric liquid crystalline structure being changed in the edge-shaped-structure parts and their vicinity.

2. The projection screen according to claim 1 wherein the polarized-light selective reflection layer selectively reflects light in a specific wave range that covers only a part of the visible region.

3. The projection screen according to claim 2, wherein the polarized-light selective reflection layer has, for light in a wave range that covers only a part of the visible region, a reflectivity not less than half the maximum reflectivity of this layer.

4. The projection screen according to claim 2, wherein assuming that light enters the polarized-light selective reflection layer vertically to it, the polarized-light selective reflection layer selectively reflects light in wave ranges whose centers are between 430 nm and 460 nm, between 540 nm and 570 nm, and between 580 nm and 620 nm.

5. A projection screen that displays an image by reflecting projected imaging light, the screen comprising:
   a polarized-light selective reflection layer having a cholesteric liquid crystalline structure and adapted to selectively reflect a specific polarized light component,
   wherein the polarized-light selective reflection layer selectively reflects the light component while diffusing the light component as a result of structural non-uniformity in the cholesteric liquid crystalline structure;
   the cholesteric liquid crystalline structure of the polarized-light selective reflection layer comprises a plurality of helical-structure parts that have different directions of helical axes; and
   the plurality of helical-structure parts in the cholesteric liquid crystalline structure of the polarized-light selective reflection layer contains, in one cross section taken in a direction of a normal, that is, in a direction of a thickness of a polarized-light selective reflection layer, those helical-structure parts in which the helical axes thereof are tilted clockwise relative to the normal and those helical-structure parts in which the helical axes thereof are tilted counterclockwise relative to the normal.

6. The projection screen according to claim 5, wherein in some of the helical-structure parts, the directions of the helical axes thereof are the same as the direction of the normal.

7. The projection screen according to claim 5, wherein the polarized-light selective reflection layer selectively reflects light in a specific wave range that covers only a part of the visible region.

8. The projection screen according to claim 7, wherein the polarized-light selective reflection layer has, for light in a wave range that covers only a part of the visible region, a reflectivity not less than half the maximum reflectivity of this layer.

9. The projection screen according to claim 7, wherein assuming that light enters the polarized-light selective reflection layer vertically to it, the polarized-light selective reflection layer selectively reflects light in wave ranges whose centers are between 430 nm and 460 nm, between 540 nm and 570 nm, and between 580 nm and 620 nm.

10. A projection screen that displays an image by reflecting projected imaging light, the screen comprising:
    a polarized-light selective reflection layer having a cholesteric liquid crystalline structure and adapted to selectively reflect a specific polarized light component,
    wherein the polarized-light selective reflection layer selectively reflects the light component while diffusing the light component as a result of structural non-uniformity in the cholesteric liquid crystalline structure; and
    the polarized-light selective reflection layer contains at least two partial selective reflection layers laminated to each other, each of the partial selective reflection layers having a cholesteric liquid crystalline structure adapted selectively to reflect a specific polarized light component and to diffuse the selectively reflected light component as a result of structural non-uniformity in the cholesteric liquid crystalline structure, and the liquid crystalline structures of the partial selective reflection layers are different in helical pitch.

11. The projection screen according to claim 10, further comprising a substrate that supports the polarized-light selective reflection layer.

12. The projection screen according to claim 11, wherein the substrate comprises a light-absorbing layer adapted to absorb light in the visible region.

13. The projection screen according to claim 11, further comprising an intermediate layer between the polarized-light selective reflection layer and the substrate, whereby liquid crystalline molecules in the cholesteric liquid crystalline structure of the polarized-light selective reflection layer, present in a vicinity of a surface of the intermediate layer, are aligned so that directors of the liquid crystalline molecules point in a plurality of directions.

14. The projection screen according to claim 13, wherein the intermediate layer is an adhesion-improving layer for improving adhesion between the polarized-light selective reflection layer and the substrate.

15. The projection screen according to claim 13, wherein the intermediate layer comprises a light-absorbing layer adapted to absorb light in the visible region.

16. The projection screen according to claim 11, further comprising, on a side of the substrate opposite to a side on which the polarized-light selective reflection layer is provided, a pressure sensitive adhesive layer so that the substrate on which the polarized-light selective reflection layer is provided can be affixed to an external member.

17. The projection screen according to claim 11, further comprising, on a side of substrate opposite to a side on which the polarized-light selective reflection layer is provided, a light-reflecting layer for reflecting light that is incident on the substrate.

18. The projection screen according to claim 10, further comprising, on an outermost, viewer's side surface of the polarized-light selective reflection layer, a hard coat layer for preventing the surface of the projection screen from being scratched.

19. The projection screen according to claim 18, wherein the hard coat layer has a surface hardness of 2H or more when expressed by the pencil hardness.

20. The projection screen according to claim 10, further comprising, on a viewer's side of the polarized-light selective reflection layer, an anti-glaring layer for preventing the projection screen from glaring.

21. The projection screen according to claim 10, further comprising, on a viewer's side of the polarized-light selective reflection layer, an anti-reflection layer for preventing the projection screen from reflecting extraneous light.

22. A projection screen that displays an image by reflecting projected imaging light, the screen comprising:
a polarized-light selective reflection layer having a cholesteric liquid crystalline structure and adapted to selectively reflect a specific polarized light component; and
an ultraviolet-absorbing layer, which is located on a viewer's side of the polarized light selective reflection layer, adapted to absorb ultraviolet light incident on the projection screen,
wherein the polarized-light selective reflection layer selectively reflects the light component while diffusing the light component as a result of structural non-uniformity in the cholesteric liquid crystalline structure.

23. The projection screen according to claim 22, further comprising, on at least one of a viewer's side and backside surfaces of the polarized-light selective reflection layer, an antistatic layer for preventing the projection screen from being electrostatically charged.

24. The projection screen according to claim 23, wherein the antistatic layer has a surface resistivity of $1 \times 10^{11}$ Ω per square or less.

25. The projection screen according to claim 22, wherein the polarized-light selective reflection layer is made from a polymerizable liquid crystalline material.

26. A projection system comprising:
a projection screen that displays an image by reflecting projected imaging light, the screen comprising:
a polarized-light selective reflection layer having a cholesteric liquid crystalline structure and adapted to selectively reflect a specific polarized light component; and
an illuminant for illuminating a space in which the projection screen is placed, the illuminant being so positioned that light emitted from the illuminant indirectly illuminates the projection screen via a reflector,
wherein the light emitted from the illuminant toward the reflector contains mainly a polarized light component that is identical to a polarized light component that the projection screen selectively reflects;
the polarized-light selective reflection layer selectively reflects the light component while diffusing the light component as a result of structural non-uniformity in the cholesteric liquid crystalline structure; and
a projector that projects imaging light on the projection screen.

27. The projection system according to claim 26, wherein the projection screen selectively reflects light in a wave range that is identical to a wave range in which the imaging light projected from the projector falls.

28. The projection system according to claim 26, wherein the imaging light to be projected on the projection screen from the projector contains mainly a polarized light component that is identical to a polarized light component that the projection screen selectively reflects.

29. The projection system according to claim 26, further comprising an illuminant for illuminating a space in which the projection screen is placed, the illuminant being so positioned that light emitted from the illuminant directly illuminates the projection screen,
wherein the light emitted from the illuminant toward the projection screen contains mainly a polarized light component that is different from a polarized light component that the projection screen selectively reflects.

* * * * *